US012706940B1

(12) United States Patent
Bayless et al.

(10) Patent No.: US 12,706,940 B1
(45) Date of Patent: Aug. 11, 2026

(54) USING LARGE LANGUAGE MODELS TO INFER INTENTS OF APPLICATIONS

(71) Applicant: Amazon Technologies, Inc., Seattle, WA (US)

(72) Inventors: Samuel Bayless, Seattle, WA (US); Aaron Robert Bradley, Boulder, CO (US); Lee Pike, Portland, OR (US); Nishant Kumar, Los Angeles, CA (US); Shachar Israel Hirshberg, New York, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 212 days.

(21) Appl. No.: 18/226,434

(22) Filed: Jul. 26, 2023

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01)

(58) Field of Classification Search
CPC ............................ H04L 63/1433; H04L 41/16
See application file for complete search history.

(56) References Cited

U.S. PATENT DOCUMENTS

| | | | | |
|---|---|---|---|---|
| 7,831,412 | B1 * | 11/2010 | Sobel | G06F 11/3476 702/179 |
| 11,290,493 | B2 * | 3/2022 | Woolward | H04L 63/1433 |
| 11,856,017 | B2 * | 12/2023 | Hodgman | H04L 63/1433 |
| 11,907,230 | B1 * | 2/2024 | Patel | G06N 5/043 |
| 11,968,088 | B1 * | 4/2024 | Yan | H04L 41/0823 |
| 2009/0216697 | A1 * | 8/2009 | Beaty | G06F 16/24578 706/45 |
| 2014/0337086 | A1 * | 11/2014 | Asenjo | H04L 63/1433 705/7.28 |
| 2020/0310853 | A1 * | 10/2020 | Featonby | G06F 9/45558 |
| 2024/0372876 | A1 * | 11/2024 | Shachar | H04L 63/1425 |
| 2025/0005489 | A1 * | 1/2025 | Wuest | G06F 21/566 |

* cited by examiner

*Primary Examiner* — Nam T Tran
(74) *Attorney, Agent, or Firm* — Perilla Knox & Hildebrandt LLP; Jonathan A. Paulis

(57) ABSTRACT

Techniques for an intent-inference system to use large language models (LLMs) to infer intents of applications running in user accounts. The system is granted permissions to obtain metadata for application resources, and uses the LLMs to analyze the metadata and infer the intended functionality of the applications. The system uses prompt engineering to interact with the LLMs by embedding the metadata as input into the LLMs, and has LLMs infer the intended functionality of resources in an application. The system generates a formal specification of the application that defines the intended relationships between the resources, and the overall functionality of the application. The formal specification may be used to generate a human-readable summary for users to validate that the inferred formal specification matches their understanding of their application. Further, the intent-inference system may generate a machine-readable representation of the formal specification that is used for various use cases.

15 Claims, 13 Drawing Sheets

RUN THE APPLICATION IN THE CLOUD SYSTEM ON BEHALF OF A USER ACCOUNT REGISTERED WITH THE CLOUD SYSTEM, THE APPLICATION INCLUDING A PLURALITY OF RESOURCES
702

OBTAIN ACTUAL CONFIGURATIONS FOR THE SET OF RESOURCES
704

PROVIDE THE LLM WITH A FIRST PORTION OF THE ACTUAL CONFIGURATIONS FOR A SUBSET OF THE RESOURCES AND REFRAINING FROM PROVIDING THE LLM WITH A SECOND PORTION OF THE ACTUAL CONFIGURATIONS FOR A PARTICULAR RESOURCE;
706

RECEIVE, AS OUTPUT FROM THE LLM, AN INDICATION OF INFERRED CONFIGURATIONS FOR THE PARTICULAR RESOURCE
708

IDENTIFY A DIFFERENCE BETWEEN THE INFERRED CONFIGURATIONS AND THE SECOND PORTION OF THE ACTUAL CONFIGURATIONS FOR THE PARTICULAR RESOURCE
710

PROVIDE THE USER ACCOUNT WITH INFORMATION INDICATING A CHANGE FOR THE SECOND PORTION OF THE ACTUAL CONFIGURATIONS OF THE PARTICULAR RESOURCE TO REMEDY THE DIFFERENCE FROM THE INFERRED CONFIGURATIONS
712

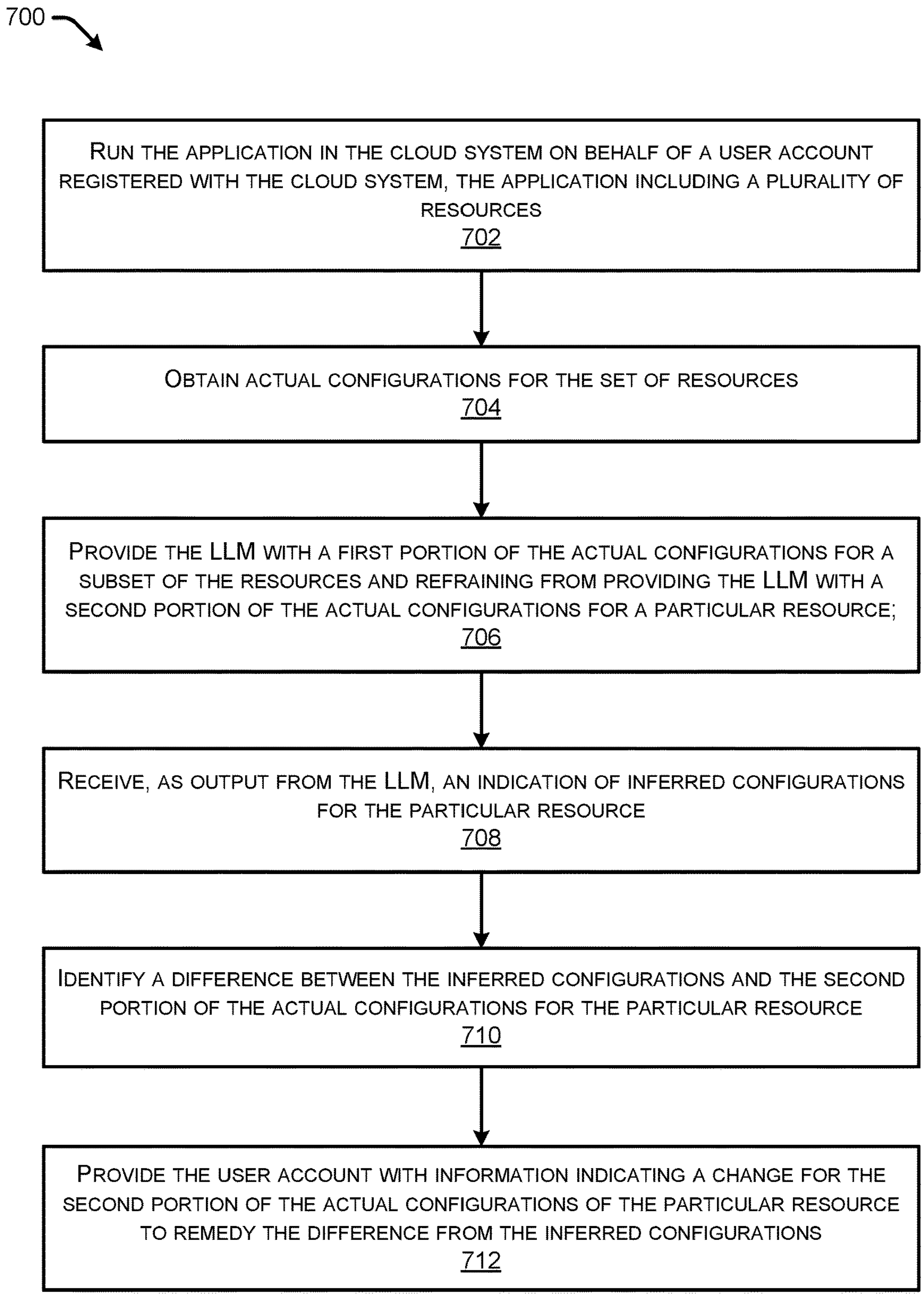

FIG. 7

USING LARGE LANGUAGE MODELS TO INFER INTENTS OF APPLICATIONS

BACKGROUND

Cloud providers offer cloud-based services to fulfill users' computing-service needs without the users having to invest in and maintain computing infrastructure required to implement their services. These cloud providers maintain networks of managed computing resources and functionality to implement various types of scalable, on-demand services, to support applications of the users. Specifically, the cloud providers may maintain networks of data centers, which in turn may include a number of interconnected computing devices (or "servers"), that provide computing resources to support applications of the users. Users may be provided with logically isolated portions of the cloud provider network, often referred to as virtual networks (VNets) or virtual private clouds (VPCs), in which they can launch resources to support their applications. Users of cloud systems can launch and run various types of applications on scalable resources in their VPCs, such as their own proprietary applications, cloud-native applications provided by the cloud provider, and third-party applications provided by third-party developers. Because VPC constructs provide isolation and security to users by preventing others from accessing their VPCs, cloud providers do not have any insight into what applications are running in the user VPCs. While this privacy is preferred for most instances, this lack of visibility makes it difficult for cloud providers to help users troubleshoot issues, detect security concerns, and identify other optimizations or improvements to the applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example process for an intent-inference system to determine inferred configurations for a resource of an application, identify a difference between the inferred configurations and actual configurations, and provide a user account with information around a change for the actual configurations.

DETAILED DESCRIPTION

Figure 1:
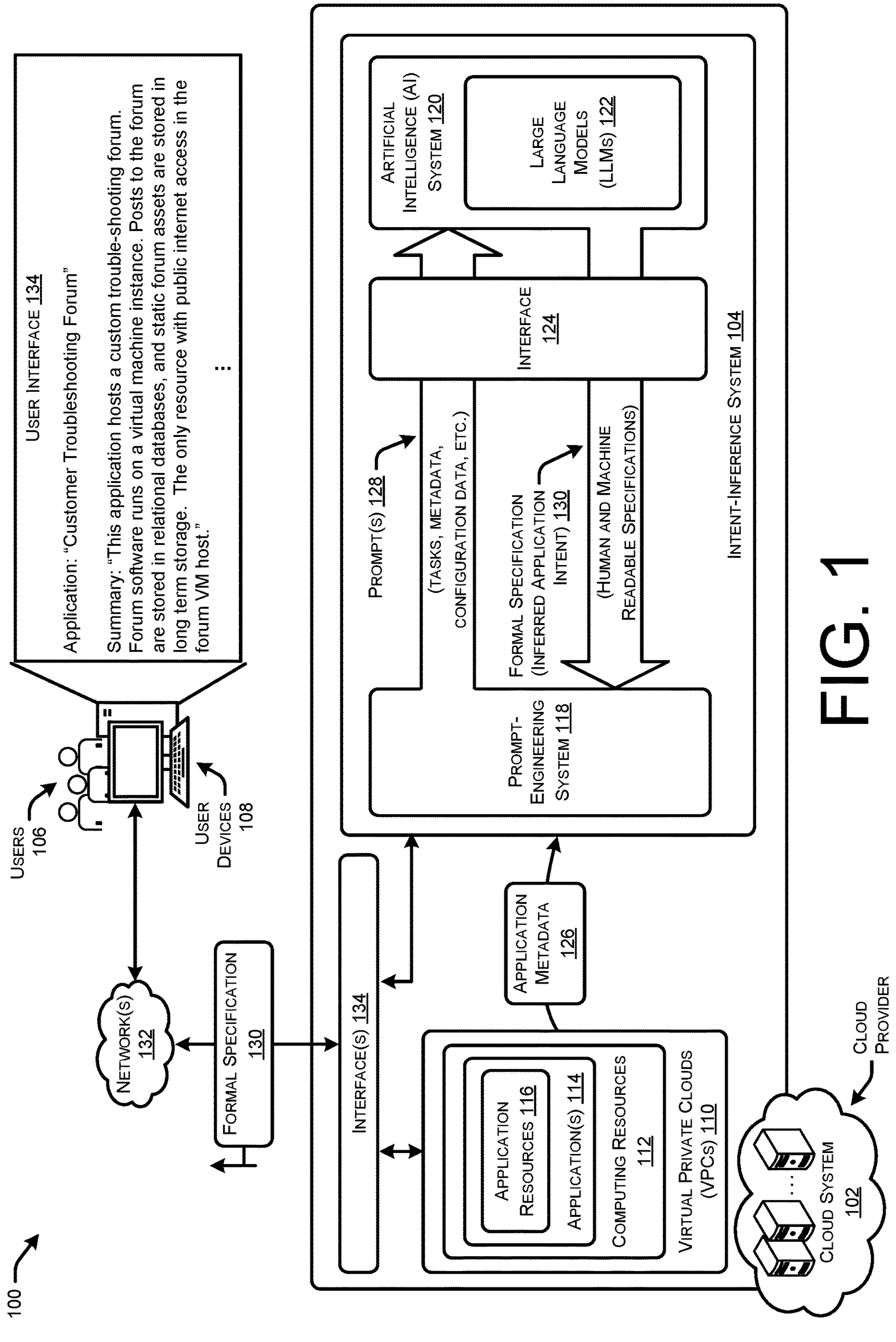
FIG. 1 illustrates a system-architecture diagram of an example environment in which an intent-inference system of a cloud system uses large language models (LLMs) to infer intents or functionalities of applications.

This disclosure describes techniques for an intent-inference system to use large language models (LLMs) to infer intents or functionalities of applications, and to then use that information to either ensure that users have configured the appropriate resources in the appropriate way for such applications or else alert the user to the misconfiguration and recommend remediation. As noted above, cloud providers generally have little or no insight into what applications are running in user accounts. However, there is a multitude of useful metadata that users can make available to cloud providers, such as resource names, tags, and configurations. According to the techniques described herein, the intent-inference system is granted permissions from users to obtain metadata for application resources, and uses the LLMs to analyze the metadata and infer the intended functionality of the applications running in user accounts. The intent-inference system uses prompt engineering to interact with the LLMs by embedding the metadata as input into the LLMs along with tasks for the LLMs to perform. The intent-inference system iteratively (potentially in parallel) has LLMs infer, or make a best guess, as to the intended functionality of each resource in a user's application. The intent-inference system then generates a formal specification of a user's application that defines what appears to be the intended relationships between resources in the account. The formal specification may include a human-readable summary that is used by users to validate that the inferred formal specification matches their understanding of their application. Further, the intent-inference system may include a machine-readable representation of the formal specification that is used for various use cases, such as identifying security vulnerabilities, identifying opportunities for right sizing resources, ranking findings from security products to highlight relevant security alerts and reduce alert fatigue, and troubleshooting user issues Users desire to deploy and host applications in cloud systems, but want to maintain privacy as if the applications were running in on-premises networks. Accordingly, users run their applications in VPCs, which are logically isolated sections of a cloud system that serve as private virtual environments to which only permitted accounts have access to use. Users run various types of applications in their VPCs, such as web applications, mobile application backends, microservice applications, data processing applications, and enterprise applications. By running these applications in private VPCs, users are guaranteed privacy for their applications from all external users, including the cloud providers themselves. However, users often experience issues and request that the cloud providers help troubleshoot these issues. Additionally, users may be unfamiliar with how to ensure security for their applications, or optimize the performance of their applications, and may desire that the cloud providers use their expertise to help with these issues.

Accordingly, the intent-inference system may, with permissions of the users and/or by request, perform techniques to infer the intended functionality of applications. Initially, the intent-inference system may collect various metadata for an application of a user. The metadata may include various types of data, such as names of the resources, tags assigned to the resources (e.g., metadata labels that impart context to the resources), and configurations of the resources. The intent-inference system may be given permissions to use one or more application programming interface (API) calls to collect this metadata, such as describe API calls. The metadata may include resource identifiers (IDs), states or statuses of the resources, configuration details, connectivity and network information, access permissions and security, associated resources, names, and tags for the resources.

After collecting the metadata, the intent-inference system may use the LLMs to infer the intended functionality of the application. The LLMs may be trained on various training data in order to analyze metadata for resources of an application, and make a best guess as to what application the user is running based on the patterns that the LLMs have seen in the past. In some examples, the intent-inference system may have the LLMs infer the intended functionality of resources on a resource-by-resource basis. To do so, the intent-inference system may provide the LLMs with metadata for the resource in question (e.g., name, tags, etc.), and may also provide the LLMs with configuration data for other resources, but refrain from providing any or too much configuration data for the resource in question. An advantage of using an LLM is the phenomenon of "hallucination" where the LLM generates outputs that seem reasonable or plausible, but are not grounded in actual knowledge or understanding of the context around the question. Hallucination occurs when the model generates content with a lack of contextual understanding and has to be creative to fill gaps. LLMs are trained to generate responses even when prompted with incomplete or ambiguous input, and may rely on internal knowledge to fill in the gaps to product a response.

The intent-inference system may intentionally leverage the ability of the LLMs to hallucinate, or fill in the gaps, when it comes to inferring the intent of the resources. As noted above, the intent-inference system may provide the LLMs with enough information to generate a response to a prompt to infer the intent of a resource, but withhold actual information that the intent-inference system would like for the LLMs to infer or hallucinate. For instance, the intent-inference system may ask the LLMs to infer an intent of a particular resource, and only provide certain metadata to the LLMs (e.g., name, tags, a portion of the configuration data), but refrain from providing other metadata for which the intent-inference system would like the LLMs to infer or hallucinate on. In this way, the intent-inference system forces the LLMs to infer, or give a best guess, as to the intended functionality of a resource based on patterns it has seen in other application architectures represented in the training data.

The intent-inference system may go through an application architecture on a resource-by-resource basis and obtain intent inferences for each resource. The intent inferences determined for each resource may generate individual resource intent specifications for each resource that represent the inferred intent of each resource (e.g., "this resource appears to be a storage instance that stores static assets for the application," or "this resource appears to be a public gateway that provides Internet access to users of the application). In addition to the inferred intent, the resource intent specifications may further indicate other information such as relationships that the resource has with other resources and indications of types of the resources.

After generating the resource intent specifications, the intent-inference system may provide the LLMs with all of the resource intent specifications and request that the LLMs generate a formal specification that represents an inferred overall intent of the application. The LLMs may analyze all of the resource intent specifications and determine that the patterns of resources and relationships are most similar to a particular application type that the intent-inference system has seen during training. The LLMs may then generate a high-level formal specification of the application that defines the intended relationships between the resources in the account, and also the overall inferred intent of the application.

In some instances, the LLMs may further generate a human-readable summary of the formal specification of the application. This human-readable summary or representation of the formal specification may be provided to an administrator or managing account associated with the application such that the user can compare the overview of the inferred application intent with their understanding of their application to validate that the inferred formal specification matches their understanding.

The LLMs may additionally, or alternatively, generate a machine-readable summary of the formal specification of the application that can be used by various downstream services of the cloud system. For example, network-security services may analyze the formal specification using automated reasoning tools and findings produced by the network-security services. Although the intent analysis performed by the LLMs is not always perfect, in many cases the LLMs correctly infer the intended high-level functionality of an application as well as the intended use-case for and relationships between each resource in the application. For example, the intent-inference system may use the LLMs and currently identify what roles (e.g., set of permissions) should have READ or WRITE access to which resources, which resources should have Internet access (and on what ports), and other information related to the security of the applications. The network-security service may analyze the relationships in the formal specification with respect to actual configurations and determine that the actual configurations have a misconfiguration with respect to best practices indicated by the formal specification. In such examples, the network-security service may then generate (e.g., with the LLMs) a security assessment that explains why the security finding is important, and appropriately ranks or filters the finding in a listing of findings based on the criticality of the finding.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an intent-inference system 104 of a cloud system 102 uses large language models (LLMs) to infer intents or functionalities of applications.

The cloud system 102 may be operated and/or managed by a cloud or service provider and may provide various services to users to fulfil their computing resource needs, such as cloud-based computing resources. For instance, users 106 may operate user devices 108 in order to register for use of the computing resources of the cloud system 102. The cloud system 102 may include a one or more managed services that include components to provide different types of automated, or semi-automated, services for users, such as an intent-inference system 104. Generally, the intent-inference system 104 may be, at least partly, control-plane systems that control operations occurring in the cloud system 102. The intent-inference system 104 may be either centralized, or distributed, and be supported by one or more computing devices.

As illustrated, a cloud system 102 may be operated and/or managed by a cloud provider. The cloud system 102 may provide various services to users to fulfil their computing resource needs, such as cloud-based computing resources. For example, the cloud system 102 may provide cloud-based, scalable, and network accessible compute power services, storage services, database services, and/or other services. Users 106 may utilize computing devices to subscribe for use of the computing resources and/or services provided by the cloud system 102.

A cloud system 102, often referred to as a cloud provider network or simply as a "cloud," refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud system 102 may deliver content from points of presence outside of, but networked with, these regions by way of edge locations and regional edge cache servers. This compartmentalization and geographic distribution of computing hardware enables the cloud system 102 to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud system 102 may provide on-demand, scalable computing services to organizations through a network, for example allowing organizations to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows organizations to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the organizations, the hardware associated with the virtual computing devices can be scaled up or down depending upon the resources the organizations require. Organizations can choose to deploy their virtual computing systems to provide network-based services for their own use and/or for use by their users or client.

The cloud system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by organizations of the cloud system 102, which may be provisioned in user accounts.

The cloud system 102 may offer many different built-in services to the organizations to help run their applications and services. For instance, the cloud system 102 may provide organizations with use of VPCs 110, which are logically isolated sections of the cloud system 102 that serve as private virtual environments to which only permitted accounts have access to use. Organizations may have multiple VPCs 110, potentially spanning across different regions of the cloud system 102. To help interconnect VPCs 110 and other resources of the user's computing infrastructure, the service provider may also offer many different built-in networking services. The VPCs may be used by the organizations to create subnetworks, configure personalized route tables, choose IP addresses, monitor connections, screen network traffic, restrict access into the VPCs, and/or for other operations. As shown. The VPCs 110 include or run computing resources 112, such as servers, virtual machines (VMs), containers, serverless functions, workloads, processes, etc. Generally, the computing resources 112 are used to support or run applications or services of the organizations.

A virtual private cloud (VPC) 110 (also referred to as a virtual network (VNet), virtual private network, or virtual cloud network, in various implementations) is a custom-defined, virtual network within another network, such as a cloud provider network. A VPC 110 can provide the foundational network layer for a cloud service, for example a compute cloud or an edge cloud, or for a customer application or workload that runs on the cloud. A VPC 110 can be defined by at least its address space, internal structure (e.g., the computing resources that comprise the VPC, security groups), and transit paths.

A VPC 110 is a virtual network dedicated to a particular customer account (or set of related customer accounts, such as different customer accounts belonging to the same business organization). A VPC 110 is logically isolated from other virtual networks in the cloud. Customers can launch resources, such as compute instances, into a VPC 110. When creating a VPC 110, a customer can specify a range of IPv4 addresses for the VPC 110 in the form of a Classless Inter-Domain Routing (CIDR) block. A VPC 110 can span all of the availability zones in a particular region. After creating a VPC 110, a customer can add one or more subnets in each availability zone or edge location.

Users 106 desire to deploy and host applications 114 in cloud systems 102, and want to maintain privacy as if the applications 114 were running in on-premises networks. Accordingly, users 106 run their applications 114 in VPCs 110 and on computing resources 112 of the cloud system 102. The computing resources 112 may comprise any type of resource, such as CPU resources (e.g., server processors, virtual machines, containers, etc.), GPU resources, memory resources (e.g., random access memory, cache memory, etc.), storage (e.g., random operating memory (ROM), etc.), and networking resources.

The applications 114 may include or be comprised of application resources 116 that support the functionality of the application 114. The application resources 116 may comprise virtual machines, containers, database instances, long term storage instances, networking resources and gateways, firewalls, subnets, VPCs, load balancers, security resources, analytics and machine learning resources, monitoring resources, and so forth.

As shown, the intent-inference system 104 may include a prompt-engineering system 118 that performs prompt engineering with an artificial intelligence (AI) system 120 that has one or more LLMs 122 via an interface 124. Prompt engineering is the process of designing and refining prompts or instructions for generating specific responses from LLMs 122. The prompt-engineering system 118 may formulate prompts or queries in away that elicits desired outputs from the LLMs 122. For instance, the prompt-engineering system 118 may specify the desired format or structure of the response (e.g., JavaScript Object Notation (JSON), YAML, eXtensible Markup Language (XML), providing context or instructions that guide the model's behavior, incorporating examples or templates to guide the model's understanding, using system or user-specific information to personalize responses, iteratively refining prompts based on experimentation and feedback, and so forth. For instance, the prompt-engineering system 118 may inform the LLMs 122 that they are an agent that analyzes metadata for application resources 116 in an application 114 and infers an intended functionality of the application 114.

Generally, a language model is a type of artificial intelligence (AI) model that is trained on textual data to generate coherent and contextually relevant text. A "large" language model refers to a language model that has been trained on an extensive dataset and has a high number of parameters, enabling them to capture complex language patterns and perform a wider range of tasks. Large language models 122 are designed to handle a wide range of natural language processing tasks, such as text completion, translation, summarization, and even conversation. The specific parameter count required for a model to be considered a "large" language model can vary depending on context and technological advancements. However, traditionally, large language models have millions to billions of parameters. Although the present disclosure provides examples that refer to LLMs 122, it will be appreciated that language models of varying sizes can be used.

In some instances, the interface 124 may be a chat interface through which users and/or programs are able to submit text (and other input) prompts. However, the interface 124 may be any type of interface 124 through which software and/or users 106 can communicate with the LLMs 122, such as CLIs, APIs, or any other type of software instructions. Thus, although some of the examples described and/or illustrated herein are shown with the interface 124 being a chat interface, those are merely for illustrative purposes and the interface 124 may comprise any type of interface through which the prompt-engineering system 118 (and/or users 106) can use to interface with the LLMs 122.

As shown, the intent-inference system 104 may, with permissions of the users 106 and/or by request, perform techniques to infer the intended functionality of applications 114. Initially, the intent-inference system 104 may collect various metadata 126 for an application 114 of a user 106. The metadata 126 may include various types of data, such as names of the resources 116, tags assigned to the resources 116 (e.g., metadata labels that impart context to the resources), and configurations of the resources 116. The intent-inference system 102 may be given permissions to use one or more APIs to collect this metadata 126, such as describe API calls. The metadata 126 may include resource identifiers (IDs), states or statuses of the resources, configuration details, connectivity and network information, access permissions and security, associated resources, names, and tags for the resources 116.

An API may refer to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

After collecting the metadata 126, the intent-inference system 104 may use the LLMs 122 to infer the intended functionality of the application 114. The LLMs 122 may be trained on various training data in order to analyze metadata 126 for resources 116 of an application 114, and make a best guess as to what application 114 the user 106 is running based on the patterns that the LLMs 122 have seen in the past. In some examples, the intent-inference system 104 may have the LLMs 122 infer the intended functionality of resources 116 on a resource-by-resource basis. To do so, the intent-inference system 104 may provide the LLMs 122 with metadata 126 for the resource 116 in question (e.g., name, tags, etc.), and may also provide the LLMs 122 with configuration data for other resources 116, but refrain from providing any or too much configuration data for the resource 116 in question. Generally, an advantage of LLMs 122 is the phenomenon of "hallucination" where the LLM 122 generates outputs that seem reasonable or plausible, but are not grounded in actual knowledge or understanding of the context around the question. Hallucination occurs when the model generates content with a lack of contextual understanding and has to be creative to fill gaps. LLMs 122 are trained to generate responses even when prompted with incomplete or ambiguous input, and may rely on internal knowledge to fill in the gaps to product a response.

The intent-inference system 104 may intentionally leverage the ability of the LLMs 122 to hallucinate, or fill in the gaps, when it comes to inferring the intent of the resources 116. As noted above, the intent-inference system 104 may provide the LLMs 122 with enough information to generate a response to a prompt to infer the intent of a resource 116, but withhold actual information that the intent-inference system 104 would like for the LLMs 122 to infer or hallucinate. For instance, as noted above, the intent-inference system 104 may ask the LLMs 122 to infer an intent of a particular resource 116, and only provide certain metadata 126 to the LLMs 122 (e.g., name, tags, a portion of the configuration data), but refrain from providing other metadata 126 for which the intent-inference system 104 would like the LLMs 122 to infer or hallucinate on. In this way, the intent-inference system 104 forces the LLMs 122 to infer, or give a best guess, as to the intended functionality of a resource 116 based on patterns it has seen in other application 114 architectures represented in the training data.

The intent-inference system 104 may go through an application 114 on a resource-by-resource basis and obtain intent inferences for each resource 116. For instance, the intent-inference system 104 may submit prompts 128 for inferred application intents. The intent-inference system 104 may generate individual resource intent specifications for each resource 116 that represent the inferred intent of each resource 116 (e.g., "this resource 116 appears to be a storage instance that stores static assets for the application 114," or "this resource 116 appears to be a public gateway that provides Internet access to users of the application 114). In addition to the inferred intent, the resource intent specifications may further indicate other information such as relationships that the resource 116 has with other resources 116 and indications of types of the resources 116.

After generating the resource intent specifications, the intent-inference system 104 may provide the LLMs 122 with all of the resource intent specifications in a prompt 128 and request that the LLMs 122 generate a formal specification 130 that represents an inferred overall intent of the application 114. The LLMs 122 may analyze all of the resource intent specifications and determine that the patterns of resources 116 and relationships are most similar to a particular application 114 type that the intent-inference system 104 has seen during training. The LLMs 122 may then generate a high-level formal specification 130 of the application 114 that defines the intended relationships between the resources 116 in the account, and also the overall inferred intent of the application 114.

In some instances, the LLMs 122 may generate a human-readable summary of the inferred intent of the application 114. This human-readable summary or representation of the inferred intent of the application 114 may be provided to an administrator or managing account associated with the application 114 such that the user 106 can compare the overview of the inferred application 114 intent with their understanding of their application 114 to validate that the inferred formal specification matches their understanding. The human-readable description of the inferred intent of the application 114 may be communicated via one or more interfaces 134 exposed by the cloud system 102, such as chat interfaces, command line interfaces (CLIs), APIs, and/or consoles. The formal specification 130 (at least the human-readable portion) may be communicated over one or more networks 132, such as the Internet and/or local area networks (LANs).

The LLMs 122 may additionally, or alternatively, generate a machine-readable summary of the formal specification of the application 114 that can be used by various downstream services of the cloud system 102. For example, network-security services may analyze the formal specification using automated reasoning tools and findings produced by the network-security services. Although the intent analysis performed by the LLMs 122 is not always perfect, in many cases the LLMs 122 correctly infer the intended high-level functionality of an application 114 as well as the intended use-case for and relationships between each resource 116 in the application 114. For example, the intent-inference system 104 may use the LLMs 122 and currently identify what roles (e.g., set of permissions) should have READ or WRITE access to which resources 116, which resources 116 should have Internet access (and on what ports), and other information related to the security of the application 114*s*. The network-security service may analyze the relationships in the formal specification with respect to actual configurations and determine that the actual configurations have a misconfiguration with respect to best practices indicated by the formal specification. In such examples, the network-security service may then generate (e.g., with the LLMs 122) a security assessment that explains why the security finding is important, and appropriately ranks or filters the finding in a listing of findings based on the criticality of the finding.

Generally, the formal specification 130 may include portions that are machine-readable representations of the applications 114, as well as human-readable descriptions of the applications 114 and/or application resources 116. For instance, the formal specification 130 may comprise JSON that has various fields, including fields that include human-readable descriptions of the applications 114, such as summaries, explanations, and so forth. Further, the JSON may include machine-readable descriptions of the applications 114 and/or application resources 116 that are more difficult for humans to understand. In some instances, the human-readable descriptions of the applications 114 and/or application resources 116 may be provided to the LLMs 122 for various use cases. For instance, it may take less text to describe applications 114 and/or application resources 116 using the human-readable representations as opposed to the machine-readable descriptions, and providing the LLMs 122 with the machine-readable descriptions may comprise more data than allowed in the context window of the LLMs 122. Accordingly, it may be advantageous to provide the LLMs 122 with human-readable descriptions of the applications 114 and/or application resources 116 for various use cases. The machine-readable descriptions of the applications 114 and/or application resources 116 may be used for various use cases as well, such as comparing inferred configurations to actual configurations of applications 114 and/or application resources 116.

The user devices 108 may receive the formal specification 130 and present a user interface 134 that includes a human-readable description of the application 114. As shown, the human-readable representation of the formal specification 130 includes a name of the application as well as a summary of the application 114 as inferred by the intent-inference system 104. However, additional details may also be presented to the user 106 in the human-readable representation of the formal specification 130. The user 106 may validate that the human-readable representation of the formal specification 130 is correct, or incorrect, and the intent-inference system 104 may update the formal specification 130 to correct inaccuracies noted by the users 106.

The artificial intelligence system 120 provides artificial intelligence (AI), which generally refers to the ability for computers to perform tasks that normally require human intelligence, such as perceiving, synthesizing, and inferring information. Generally speaking, AI systems and models ingest large amounts of data (or "training data"), analyze this data to identify correlations and patterns, and use these patterns to make predictions about future states. Although AI programs and algorithms have been around for decades, the amount of data and computing power needed to train AI models that are useful for humans has not existed. However, there have been various technological breakthroughs and advances that have accelerated the usefulness of AI, such as advent of cloud computing that provides effectively unlimited compute, advances in specialized hardware (e.g., graphics processing units (GPUs)) that efficiently train and run these AI models, and the discovery of more efficient training algorithms.

One type of artificial intelligence that has benefited greatly from these advances is generative AI. Generative AI is a type of artificial intelligence where AI models are used to create (or "generate") new content based on inputs, often in the form of prompts from humans. Various types of generative AI models exist that are trained to generate different types of data or content, such as text, images, audio (e.g., music or voices), and synthetic or other virtual data. Similar to other forms of AI, generative AI models use machine learning (ML) techniques to learn how to create content that exhibits characteristics learned from the training data used to train the models. More specifically, generative AI models use neural networks (and/or other ML algorithms) to learn the underlying correlations, patterns, and structures of datasets and generate new content.

One type of neural network architecture that has gained popularity due to its ability to reduce the amount of time needed to train generative AI models is known as the Transformer model, or simply "Transformers." Transformers apply a set of mathematical techniques, called attention or self-attention, to capture relationships in sequential data called tokens, such as words in a sentence. Transformers are able to detect subtle causal relationships between data elements in a series, including how even distant data elements influence and depend on each other. Unlike previous models that have to process tokens sequentially (e.g., Recurrent Neural Networks (RNNs)), transformers use an attention mechanism to process tokens simultaneously and calculate the attention weights, or strengths of relationships, between the tokens in successive layers. Because transformers can compute attention weights for all the tokens in parallel, the amount of time needed to train generative AI models using transformers is greatly improved over other training models.

As noted above, generative AI can be used to generate text that resembles human-like responses to prompts. Transformers are very effective in training the models used generate text, often referred to as Large Language Models (LLMs 122). LLMs 122 are trained on large sets or corpuses of text data to generate human-like textual responses to prompts. LLMs 122 are generally trained in two stages, pre-training and fine-tuning. During the pre-training stage, LLMs 122 are trained on massive datasets of unlabeled text data (or "unsupervised learning") where transformers allow the LLMs 122 to process and learn the patterns and relationships between words. During the fine-tuning stage, the LLMs 122 can be fine-tuned for specific tasks or prompts, such as summarizing content, answering questions, and text completion. There are generalized LLMs 122 that have been trained on sets of text data describing all types of content (e.g., data obtained from crawlers that scrape the public Internet). There are also specialized LLMs 122 that have been trained on specialized sets of data that are specific to a particular type of content, such as travel or shopping.

Organizations continue to train and use, or offer for use, generative AI models to perform various tasks. To interact with text-based generative AI models, or LLMs 122, users 106 are presented with a text box through which they can submit prompts for an agent representing the LLMs 122 to analyze and answer. In addition to prompts or instructions, users 106 can also provide additional data to the agent for analysis. For instance, a user 106 can request that a generative AI agent analyze a dataset that is uploaded or otherwise input to the LLMs 122 of the agent. The generative AI agent can then utilize the LLMs 122 to analyze the uploaded data and perform the task, such as text summarization or data synthesis of the data. These generative AI models have "context windows" which generally represent the amount of information the AI models can consider when processing a new input to generate content, similar to a human's memory. The larger the context window, the greater amount of data can be input into, and analyzed by, the AI models to generate a response. Thus, while it may seem intuitive for a user to provide an AI model with all information available for a question, the amount of information may exceed the context window for the AI model. In such situations, the user may instead determine to provide only the most pertinent information for the AI model when prompting the AI model to perform a task.

Generally, the LLMs 122 can only analyze a limited number of tokens (think of a token as about half a word, or approximately ~4 characters). For example, the LLM 122 used may have a context window of 4096 tokens, which is approximately 4096*4 characters (the exact token-character mapping depends on the specific text provided). A key engineering challenge of working with current-generation LLMs 122 is managing that limited context window. The combination of the chat history and the response from the LLM 122 must sum to at most 4096 tokens in this example. If too many tokens are provided in the chat history, the API will fail.

The users 106 may have created user accounts with the cloud system 102 to utilize the resources of the cloud system 102. The users 106 may utilize their user devices 108 to communicate over the one or more networks 132 (e.g., WANs, PANs, LANs, etc.) with the cloud system 102. The user devices may comprise any type of computing device configured to communicate over network(s) 132, such as mobile phones, tablets, laptop computers, desktop computers, televisions, servers, and/or any other type of computing device. The users 106 may interact with the cloud system 102, via their user account and/or one or more user portals or consoles (e.g., web console, CLI, API, etc.).

Generally, the intent-inference system 104, and components thereof, may comprise software, firmware, and/or other logic that is supported one computing device, or across more computing devices in the cloud system 102. Additionally, the intent-inference system 104 may comprise a system of other devices. The techniques described herein are generally described with respect to a service provider network, such as a cloud provider network or system. However, the techniques are generally applicable for any network, such as on-premises networks, hybrid networks, and so forth.

Figure 2:
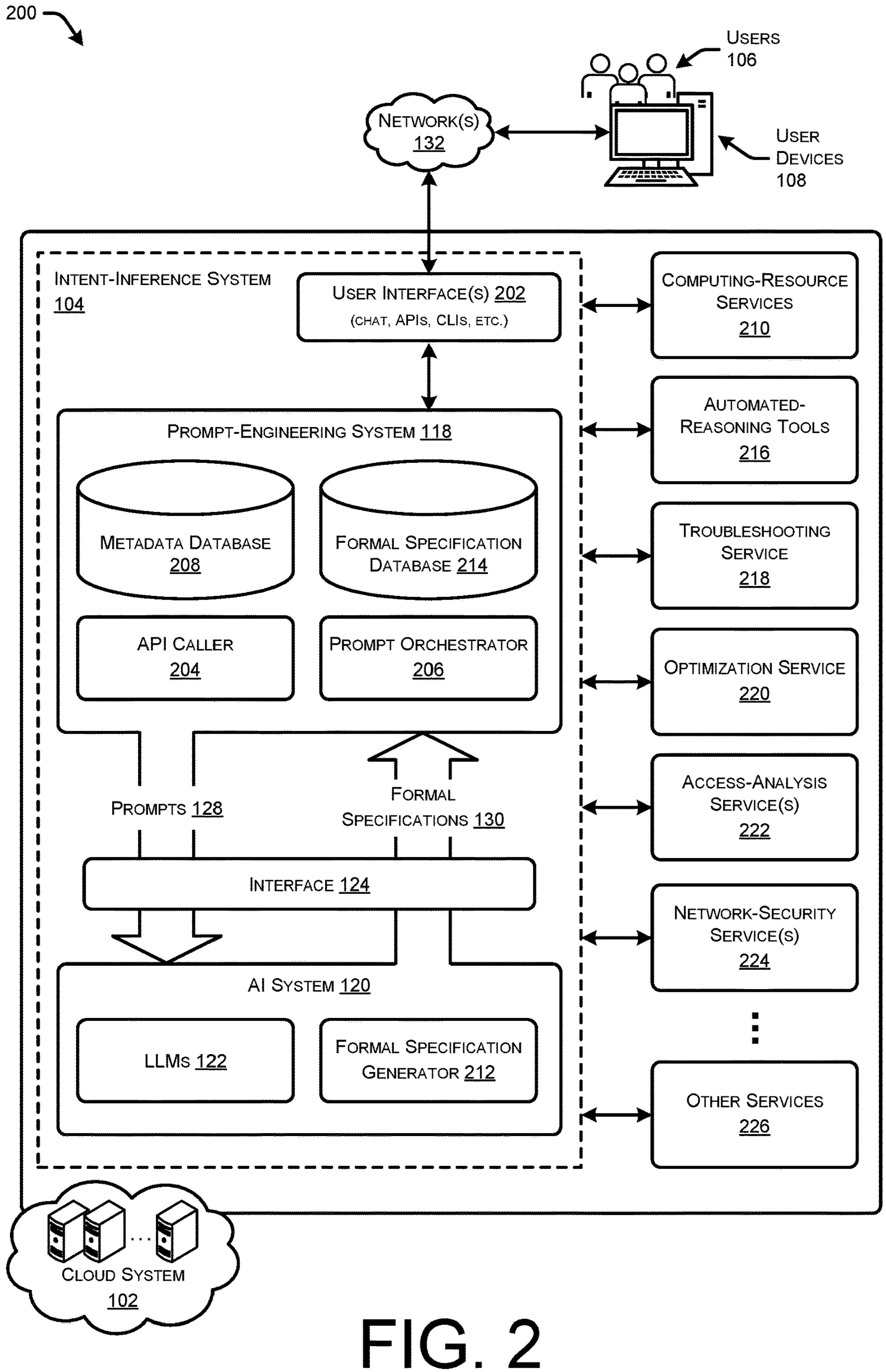
FIG. 2 illustrates a component diagram of example services of a cloud system and example components of an intent-inference system.

FIG. 2 illustrates a component diagram 200 of example services of a cloud system 102 and example components of an intent-inference system 104. As shown, the intent-inference system 104 includes one or more user interfaces 202 usable by users 106 to communicate with the intent-inference system 104, such as chat interfaces (e.g., a user interface that allows users to interact with a system or application using natural language conversations), APIs (e.g., sets of rules and protocols that define how different software components can interact and communicate with each other), and CLIs (e.g., a text-based user interface that allows users 106 to interact with a computer program or operating system by typing commands into a command-line interpreter.)

As illustrated, the prompt-engineering system 118 includes an API caller 204 that calls one or more APIs. For instance, the API caller 204 may call one or more application API calls to collect metadata 126, such as describe API calls. The metadata 126 may include resource identifiers (IDs), states or statuses of the resources, configuration details, connectivity and network information, access permissions and security, associated resources, names, and tags for the resources. The API caller 204 may store this metadata 126 in a metadata database 208.

Further, the prompt-engineering system 118 may include a prompt orchestrator 206 that performs various prompt engineering techniques. For instance, the prompt orchestrator 206 may intentionally leverage the ability of the LLMs 122 to hallucinate, or fill in the gaps, when it comes to inferring the intent of the resources 116. The intent-inference system 104 may provide the LLMs 122 with enough information to generate a response to a prompt 128 to infer the intent of a resource 116, but withhold actual information that the intent-inference system 104 would like for the LLMs 122 to infer or hallucinate. For instance, as noted above, the prompt-engineering system 118 may ask the LLMs 122 to infer an intent of a particular resource 116, and only provide certain metadata 126 to the LLMs 122 (e.g., name, tags, a portion of the configuration data), but refrain from providing other metadata 126 for which the intent-inference system 104 would like the LLMs 122 to infer or hallucinate on. In this way, the intent-inference system 104 forces the LLMs 122 to infer, or give a best guess, as to the intended functionality of a resource 116 based on patterns it has seen in other application 114 architectures represented in the training data.

The AI system 120 may, in addition to including the LLMs 122, include a formal specification generator 212 that works in conjunction with the LLMs to generate the formal specifications 130. The formal specifications 130 may be provided to the prompt-engineering system 118 and stored in the formal specification database 214.

The cloud system 102 may additionally include various services, such as computing resource services 210. The computing resources services 210 may include compute services, storage services, and/or other computing resource services. For instance, the computing-resource services 210 may provide scalable computing resources that scale based on demand, such as CPU resources, storage resources, database resources, networking resources, and so forth.

Additionally, the cloud system 102 may additionally include one or more automated-reasoning tools 216 that are used to assist in formal reasoning and mathematical proof generation. These automated-reasoning tools 216 that use logic, algorithms, and inference techniques to automatically verify the correctness of mathematical statements, prove theorems, and discover new knowledge.

Additionally, the cloud system 102 may include a troubleshooting service 218 that uses formal specifications 130 to troubleshoot issues being experienced by users 106. The troubleshooting service 218 may receive queries from uses 106 to help the users 106 fix issues they are experiencing around their applications 114. The troubleshooting service 218 may use the formal specification 130 to determine solutions for the issues. For instance, the troubleshooting service 218 may compare inferred configurations with the actual configurations of the applications 114 in order to identify differences. These differences may be indicative of misconfigurations in the application 114, and the troubleshooting service 218 may provide recommendations for the users 106 to apply that bring the actual configurations of their applications 114 in line with the inferred configurations.

The cloud system 102 may include an optimization service 220 that uses formal specifications 130 to determine or identify more optimized computing resources (e.g., VMs, containers, servers, etc.) for running applications 114. For instance, the optimization service 220 may determine more optimized virtual computing resources for your application resources 116. The optimization service 220 may compare inferred configurations with the actual configurations of the applications 114 in order to identify differences in what virtual computing resources are being used to run the application resources 116. The optimization service 220 may determine, based on the comparison, that the actual virtual computing resources (e.g., VMs, containers, etc.) being used to run the application resources 116 are too large, or too small, (overcommitted or restrained), and recommend a more appropriate virtual computing resource for the application resources 116. As another example, the optimization service 220 may identify and recommend network topology changes for the application 114. For instance, the optimization service 220 may determine that the application 114 infrastructure includes the use of a peering connection between VPCs 110, but that the inferred configurations indicate that a transit gateway might work better than the peering connection and have higher throughput between the VPCs 110.

Additionally, the cloud system 102 may include an access-analysis service 222 that identifies improper access to applications 114, and network-security services 224 that use the formal specifications 130 to generate security assessments for applications 114. Additional description of the network-security services 224 can be found with reference to FIG. 5.

As described herein, the cloud system 102 may include one or more hardware processors (processors), one or more devices, configured to execute one or more stored instructions. The processor(s) may comprise one or more cores. Further, the cloud system 102 may include one or more network interfaces configured to provide communications between the cloud system 102 and other devices, such as the user device(s), and/or other systems or devices in the cloud system 102 and/or remote from the cloud system 102. The network interfaces may include devices configured to couple to personal area networks (PANs), wired and wireless local area networks (LANs), wired and wireless wide area networks (WANs), and so forth.

The cloud system 102 may also include computer-readable media that stores various executable components (e.g., software-based components, firmware-based components, etc.). In addition to various components discussed in the previous figures, the computer-readable-media may further store components to implement functionality described herein. While not illustrated, the computer-readable media may store one or more operating systems utilized to control the operation of the one or more devices that comprise the cloud system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud system 102 may include a data store, or storage, which may comprise one, or multiple, repositories or other storage locations for persistently storing and managing collections of data such as databases, simple files, binary, and/or any other data. The storage may include one or more storage locations that may be managed by one or more database management systems.

To utilize the services provided by the cloud system 102, the users may register for accounts with the cloud system 102. For instance, users may utilize a user device to interact with an identity and access management (IAM) component that allows the users to create user accounts with the cloud system 102. Generally, the IAM component may enable the users to manage their network infrastructures remotely, and view data provided by the intent-inference system 104. Generally, the different user accounts can assume different roles, or sets or permissions/credentials, that allow users to perform different actions, and be restricted from performing some actions. In some instances, a same organization may have multiple accounts that have different network infrastructures.

The computer-readable media may be used to store and retrieve information, such as program modules, data structures, or other data. It should be appreciated by those skilled in the art that computer-readable storage media is any available media that provides for the non-transitory storage of data and that can be accessed by the cloud system 102. In some examples, the operations performed by the cloud system 102, and or any components included therein, may be supported by one or more server devices. Stated otherwise, some or all of the operations performed by the cloud system 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
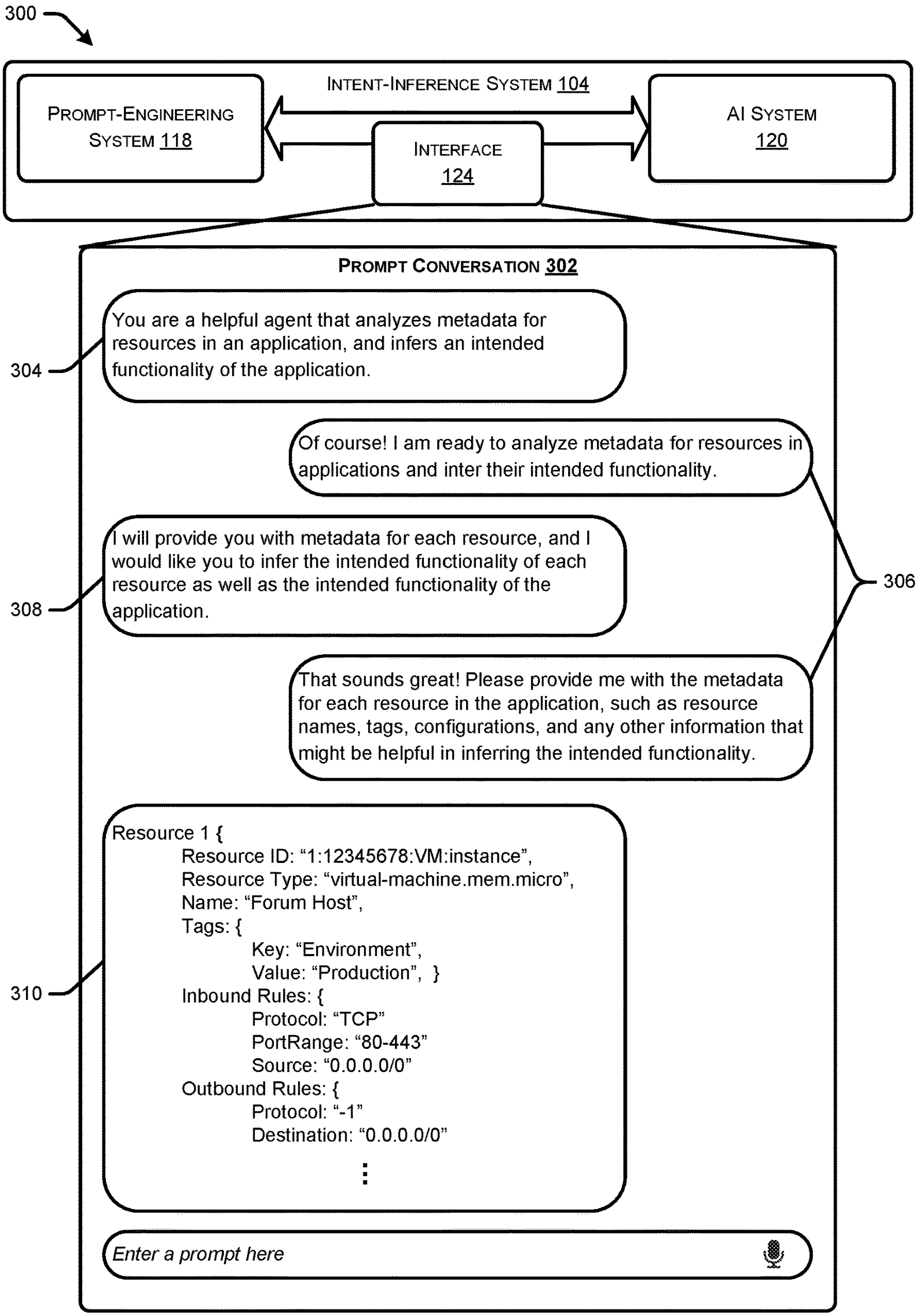
FIG. 3 illustrates an example interface through which an intent-inference system submits prompts to LLMs of an artificial intelligence (AI) system to have the LLMs infer an intent of an application.

FIG. 3 illustrates an example user interface 300 through which an intent-inference system 104 submits prompts to LLMs 122 of an AI system 120 to have the LLMs 122 infer an intent of an application 114.

The interfaces 124 include a back-and-forth between the prompt-engineering system 118 and the AI system 120. As shown, a prompt conversation 302 includes an initial prompt 304 where the prompt-engineering system 118 is providing the LLMs 122 with context around the type of analysis the LLMs 122 will be performing. Similarly, the prompt 308 provides additional context to the LLMs 122 so they are able to appropriately analyze the data and perform the tasks asked by the prompt-engineering system 118. The responses 306 each indicate that the LLMs 122, and AI system 120, understand the prompts submitted by the prompt-engineering system 118. Finally, prompt 310 includes metadata for a resource for which the prompt-engineering system 118 would like to have a resource specific inferred intent determined. The prompt-engineering system 118 may continue to provide these resource-specific prompts to the AI system 120 to get inferred intents for each resource 116.

In some instances, the interface 124 may be a chat interface through which users and/or programs are able to submit text (and other input) prompts. However, in some examples the interface 124 may be any type of interface 124 through which software can communicate with the LLMs 122, such as CLIs, APIs, or any other type of software instructions. Thus, although some of the examples described and/or illustrated herein are shown with the interface 124 being a chat interface, those are merely for illustrative purposes and the interface 124 may comprise any type of software interface through which the prompt-engineering system 118 (and/or users 106) can use to interface with the LLMs.

Figure 4:
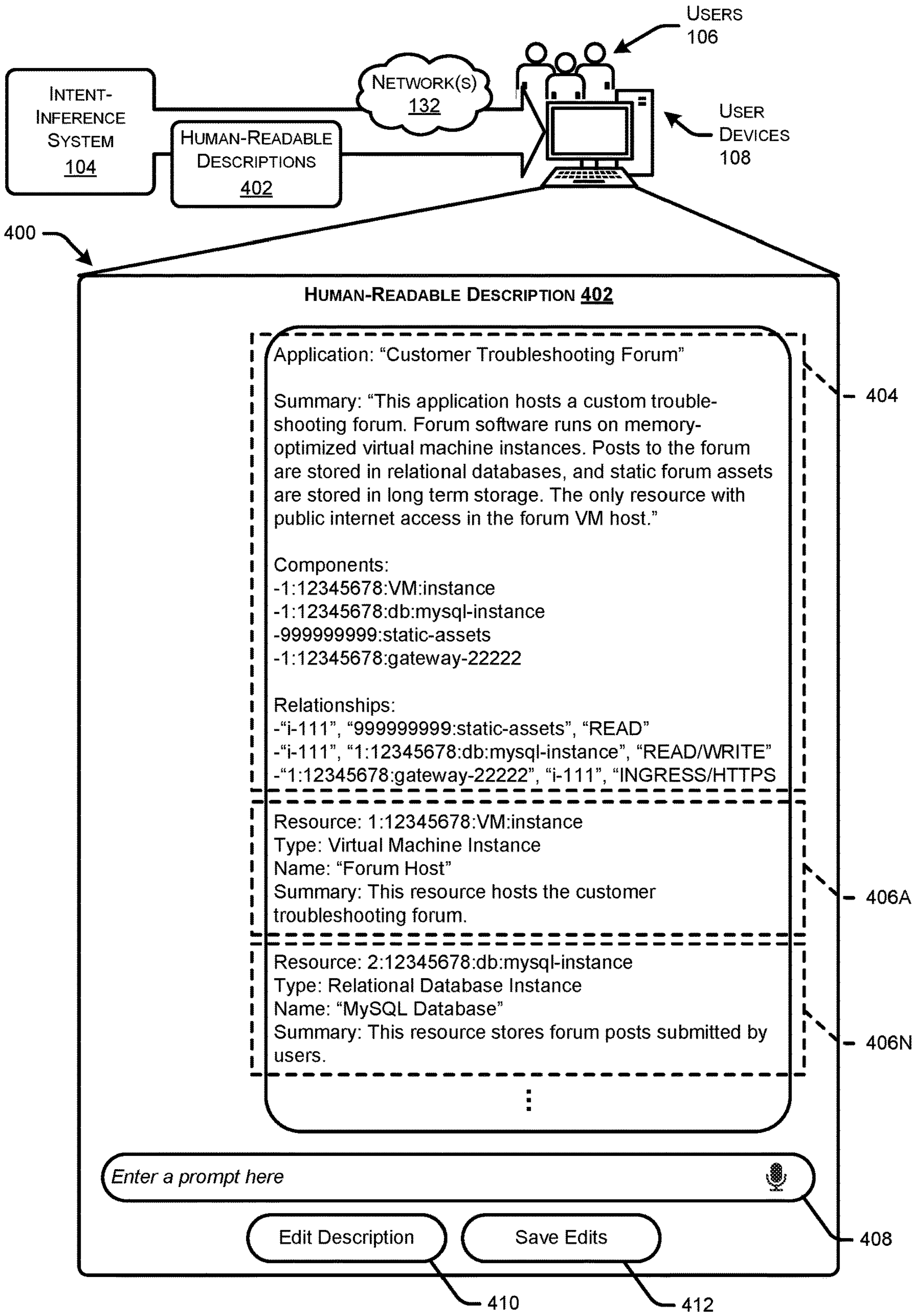
FIG. 4 illustrates an example user interface through which an intent-inference system provides a user with a human-readable description of an inferred intent of an application.

FIG. 4 illustrates an example user interface 400 through which an intent-inference system 104 presents a user 106 with a human-readable description 402 of an inferred intent of an application 114. Generally, the human-readable description 402 of the inferred intent of the application 114 is output from the LLMs 122 in the formal specification 130.

The human-readable description 402 includes an application-level summary 404 of the inferred intent of the application 114. Further, the human-readable description 402 may include a first resource-specific summary 406 and a second resource specific summary 406 of resources 116 in the application 114. The user 106 may be able to validate the summaries, and provide feedback to fix formal specifications 130 that have inaccuracies.

In some instances, the formal specification 130 may include a machine-readable description of the application 114 (e.g., JSON, XML, etc.) as well as a human-readable description of the application 114. For instance, the formal specification 130 may be JSON that includes fields in which human-readable descriptions of the inferred intents of applications 114 and/or application resources 116 are included, as well as fields in which machine-readable representations of the inferred intent of the applications 114 and/or application resources 116 are included. The intent-inference system 104 may extract the human-readable descriptions 402 of the inferred intent of the applications 114 and/or application resources 116 from the formal specification, and provide the user 106 with access to the human-readable description 402, such as via a user account.

As illustrated, the human-readable description 402 includes an application-level summary 404 where the overall inferred intent of the application is presented in a human-readable form. The application-level summary 404 include a title and summary of the application as well as components and relationships between components. The human-readable description 402 may further include application-resource summaries 406A-406N. As shown, each of the application-resource summaries 406 include a resource identifier, a type of the resource, a resource name, and/or a summary of the application resource 116.

In some instances, the human-readable description 402 may be presented in an interface 400 through which the user 106 can submit prompts in a prompt field 408 to communicate with the AI system 120. The user 106 may ask various questions related to the human-readable description 402 being presented in the interface and have a conversation with the AI system 120.

In some instances, the interface 400 may include additional options that the user 106 may select to modify the human-readable description 402. For instance, the use 106 may select an edit description option 410 that allows the user 106 to modify the human-readable description 402. For instance, the user 106 may be able to add, delete, or modify the text in the human-readable description 402 in examples where a resource description and/or application description are not inline with the users 106 understanding of the application 114. For instance, the user 106 may determine, and verify, that the LLMs 122 did not accurately infer the intent of the application 114 and/or an application resource 116. The user 106 can modify the human-readable description 402 to fix the error, and select save edits 412 once the user 106 is satisfied that the human-readable description 402 accurately portrays the intent of the application 114 and/or application resource 116. In some instances, the user 106 may additionally, or alternatively, make similar changes to machine-readable representations of the inferred intent of the application 114 and/or application resources 116. In this way, the users 106 can use the interface 400 (and/or other interfaces) to modify and verify the formal specifications 130.

Figure 5:
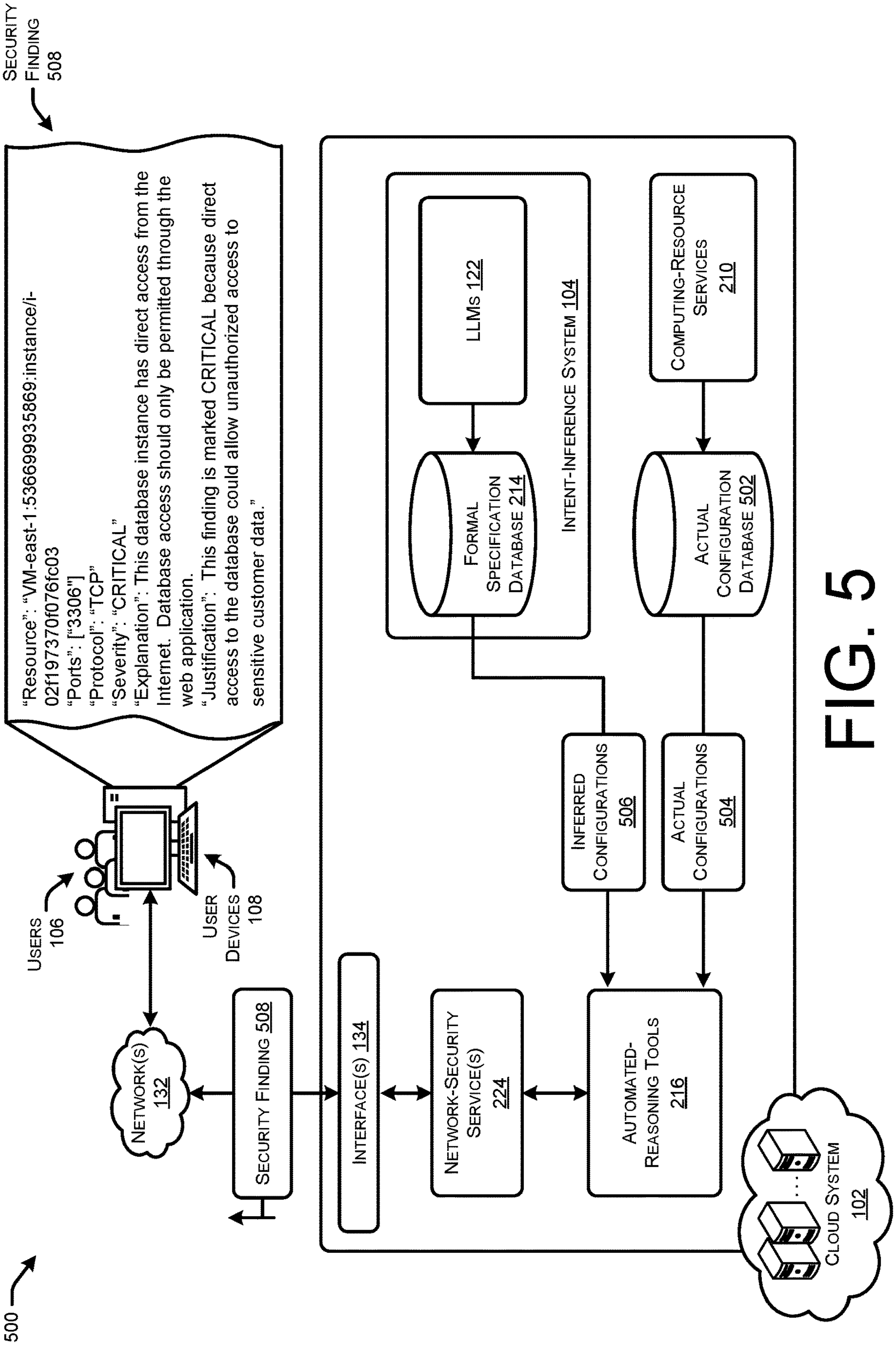
FIG. 5 illustrates an example system architecture diagram of an example environment in which a network-security service uses inferred configurations determined by an intent-inference system to determine and/or modify a security assessment of an application.

FIG. 5 illustrates an example system architecture diagram of an example environment 500 in which a network-security service 224 uses inferred configurations determined by an intent-inference system 104 to generate a security assessment of an application 114.

As illustrated, the computing-resource services 210 may store, in an actual configuration database 502, actual configurations 504 of applications 114 that have been deployed by users 106 in the cloud system 102. The actual configurations 504 may be provided to one or more automated-reasoning tools 216. Additionally, the intent-inference system 104 may provide inferred configurations 506 to the automated-reasoning tools 216. The inferred configurations 506 may be stored in the formal specification database 214, such as in formal specifications 130, and be extracted by the intent-inference system 104.

The automated-reasoning tools 216 may perform techniques for analyzing the inferred configurations 506 and actual configurations to gain insights into security findings 508 and/or to generate new security findings. Generally, cloud systems 102 include various network-security services 224 that generate security findings for applications 114 of users 106. However, there may be hundreds or thousands of security findings 508 that are generated, and it can be difficult to determine what security findings are 508 the most relevant or critical, and users 106 can be bogged down and get alert fatigue from all of the security findings 508 that are presented to them.

Accordingly, in some instances the automated-reasoning tools 216 may use the inferred configurations 506, actual configurations 504, and security findings 508 in order to prioritize or filter the security findings 508. The automated-reasoning tools 216 may decide to prioritize, or de-escalate, security findings 508 using the inferred configurations 506. As an example, the automated-reasoning tools 216 may determine that of the virtual machines or resources in an application 114 have a particular port open, such as port 22. However, the inferred configurations 506 may indicate that only one host or resource should have port 22 open. In such examples, the automated-reasoning tools 216 may determine to elevate the security findings 508 that violate the expectations or inferred intent shown in the inferred configurations 506 (e.g., resources that should, but do not, have port 22 closed). Conversely, the automated-reasoning tools 216 may determine to deescalate the security findings 508 that do not violate the expectations or inferred intent shown in the inferred configurations 506 (e.g., the host resource should have port 22 open). The automated-reasoning tools 216 may then provide these recommendations or modifications to the network-security services 224. The network security services may provide the security findings 508 to the users 106 via a user account, and may indicate why the security findings 508 were changed or modified from their original version.

As shown, a security finding 508 may be presented to the user 106 via their user device 108, and the security finding 508 may present various information associated with the resource, as well as a severity of the finding, an explanation as to why the security finding 508 was surfaced, and a justification regarding the severity of the security finding 508.

In some examples, the automated-reasoning tools 216 may be used to determine differences between the inferred configurations 506 and the actual configurations 504 that amount to security findings 508. For instance, the automated-reasoning tools 216 may determine that the inferred configurations 506 have Internet access closed to various databases that contain private user data. However, the actual configurations 504 may show that the databases have Internet access such that the data in the databases may be publicly accessible. In such examples, the automated-reasoning tools 216 may work in conjunction with the network-security services 224 to create a security finding 508 that indicates that Internet access to the databases might need to be closed.

Figure 6A:
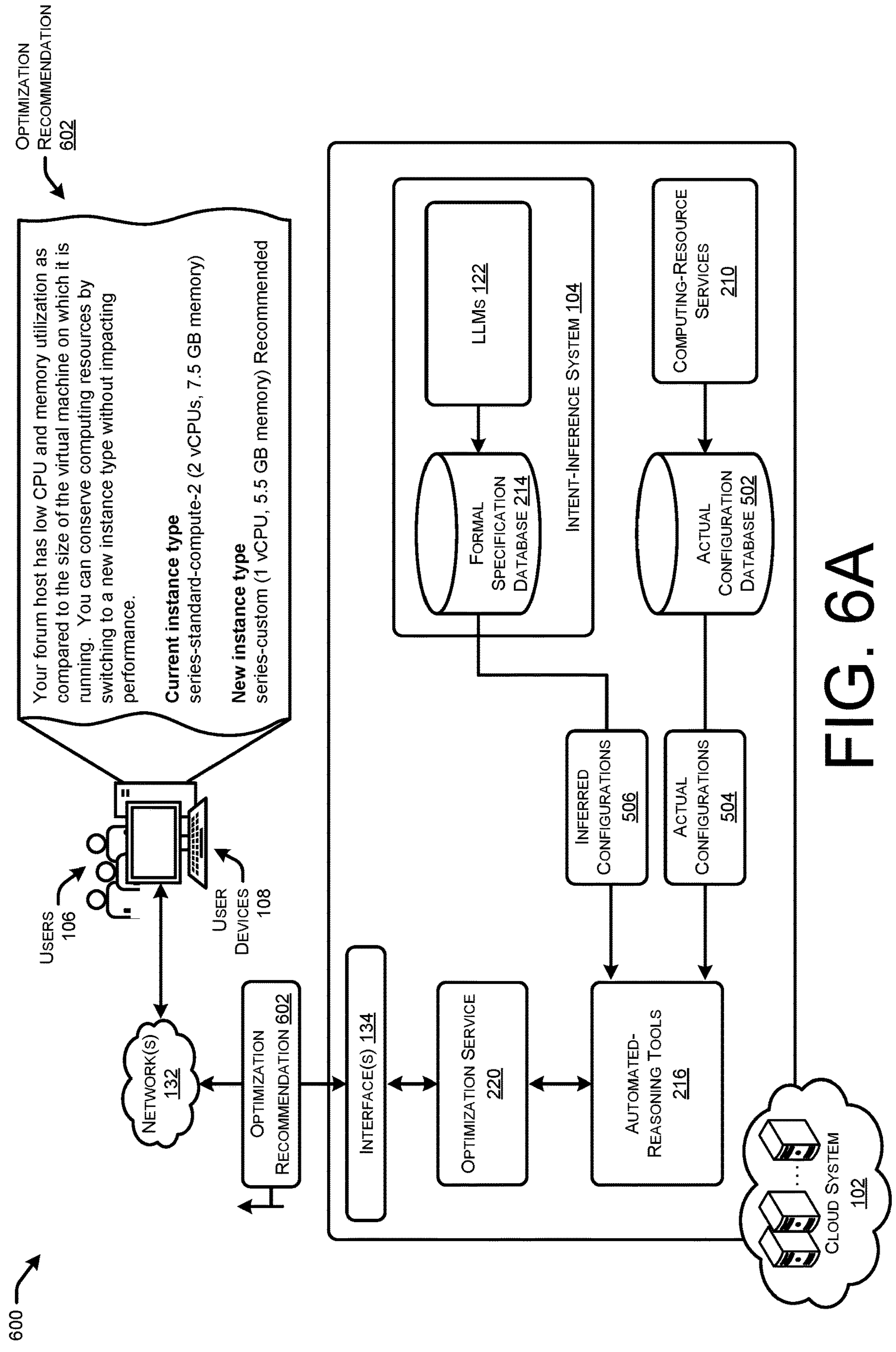
FIG. 6A illustrates an example system architecture diagram of an example environment in which an optimization service uses inferred configurations determined by an intent-inference system to identify a more optimized virtual machine for a resource in an application.

FIG. 6A illustrates an example system architecture diagram of an example environment in which an optimization service 220 uses inferred configurations 506 determined by an intent-inference system 104 to identify a more optimized virtual machine for a resource in an application 114.

As illustrated, the computing-resource services 210 may store, in an actual configuration database 502, actual configurations 504 of applications 114 that have been deployed by users 106 in the cloud system 102. The actual configurations 504 may be provided to one or more automated-reasoning tools 216. Additionally, the intent-inference system 104 may provide inferred configurations 506 to the automated-reasoning tools 216. The inferred configurations 506 may be stored in the formal specification database 214, such as in formal specifications 130, and be extracted by the intent-inference system 104.

The automated-reasoning tools 216 may perform techniques for analyzing the inferred configurations 506 and actual configurations to determine modifications or optimizations for the application 114 and/or application resources 116. For instance, the automated-reasoning tools 216 may determine differences in sizes or types of VMs that are used to host application resources 116 (as indicated by the actual configurations 504) and the sizes or types of VMs that are inferred to be used (as indicated in the inferred configurations 506). The automated-reasoning tools 216 and/or optimization service 220 may determine that the size or type of VMs indicated in the inferred configurations 506 are more suitable or optimized for hosting the application resources 116 (e.g., not overcommitted, less wasted/unused resources, etc.), and provide a user 106 with an optimization recommendation 602. The optimization recommendation 602 may provide a reason as to why the recommendation is being made, as well as indications of the current and recommended VM instance types. In other examples, the optimization service 220 may have permissions from the users 106 to automatically migrate the application resources 116 to more optimized or suitable virtual resources.

Figure 6B:
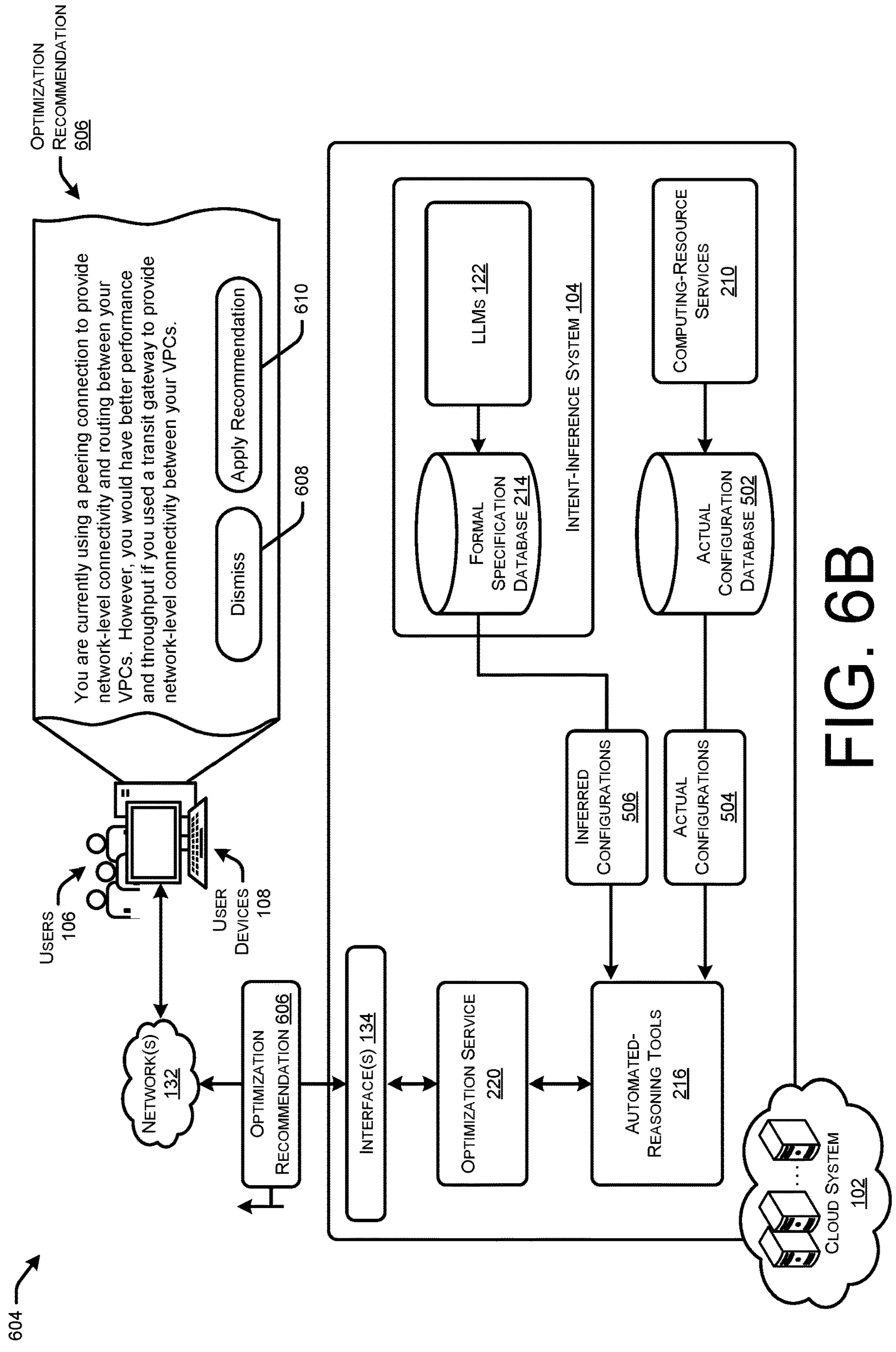
FIG. 6B illustrates an example system architecture diagram of an example environment in which an optimization service uses inferred configurations determined by an intent-inference system to identify a more optimized network topology for an application.

FIG. 6B illustrates an example system architecture diagram of an example environment 604 in which an optimization service 220 uses inferred configurations 506 determined by an intent-inference system 104 to identify a more optimized network topology for an application 114.

As illustrated, the computing-resource services 210 may store, in an actual configuration database 502, actual configurations 504 of applications 114 that have been deployed by users 106 in the cloud system 102. The actual configurations 504 may be provided to one or more automated-reasoning tools 216. Additionally, the intent-inference system 104 may provide inferred configurations 506 to the automated-reasoning tools 216. The inferred configurations 506 may be stored in the formal specification database 214, such as in formal specifications 130, and be extracted by the intent-inference system 104.

The automated-reasoning tools 216 may perform techniques for analyzing the inferred configurations 506 and actual configurations to determine modifications or optimizations for the network topology of the application 114. As an example, the automated-reasoning tool 216 may analyze the actual configurations 504 and determine that the user 106 is using a peering connection to route traffic between different VPCs 110 and provide network-level connectivity between the VPCs 110. However, the automated-reasoning tools 216 may have determined that a transit gateway may provide better performance and throughput for the particular application 114 based on the overall inferred intent of the application 114.

Thus, the automated-reasoning tools 216 may identify differences between inferred configurations 506 and actual configurations 504, and work in conjunction with the optimization service 220 to determine whether an optimization can be made to the network topology of the application 114 under analysis. Upon determining an optimization recommendation 606, the optimization service 220 may provide the user 106 with access to the optimization recommendation 606 via the user device 108.

In the illustrated example, the optimization recommendation 606 includes an explanation of the current network topology, as well as a suggested change to the network topology along with a reason or justification to make the suggested change. The interface that is presenting the optimization recommendation 606 may further include various options, such as a dismiss option 608 where the user 106 can opt to not accept the recommendation and have it dismissed, as well as an apply recommendation option 610 where the user 106 can instead accept the optimization recommendation 606 and have the change made to their account (e.g., use a transit gateway rather than a peering connection between VPCs). In some examples, the users 106 may opt to have the optimization recommendations 606 automatically approved and without input from the users 106.

Figure 8:
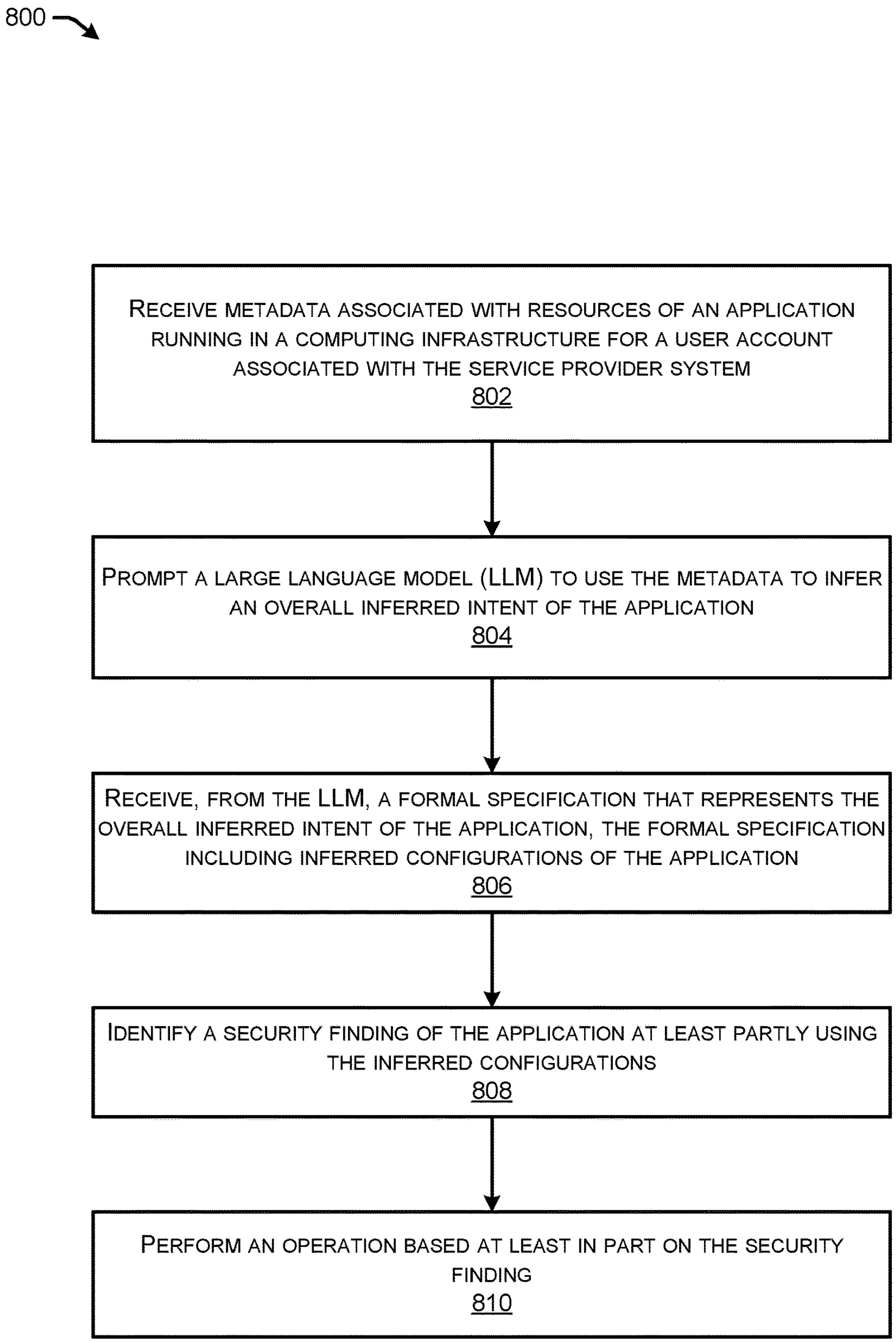
FIG. 8 illustrates a flow diagram of an example process for providing metadata of an application to an LLM to infer an overall intent of the application that is used to identify a security finding for the application.
Figure 9:
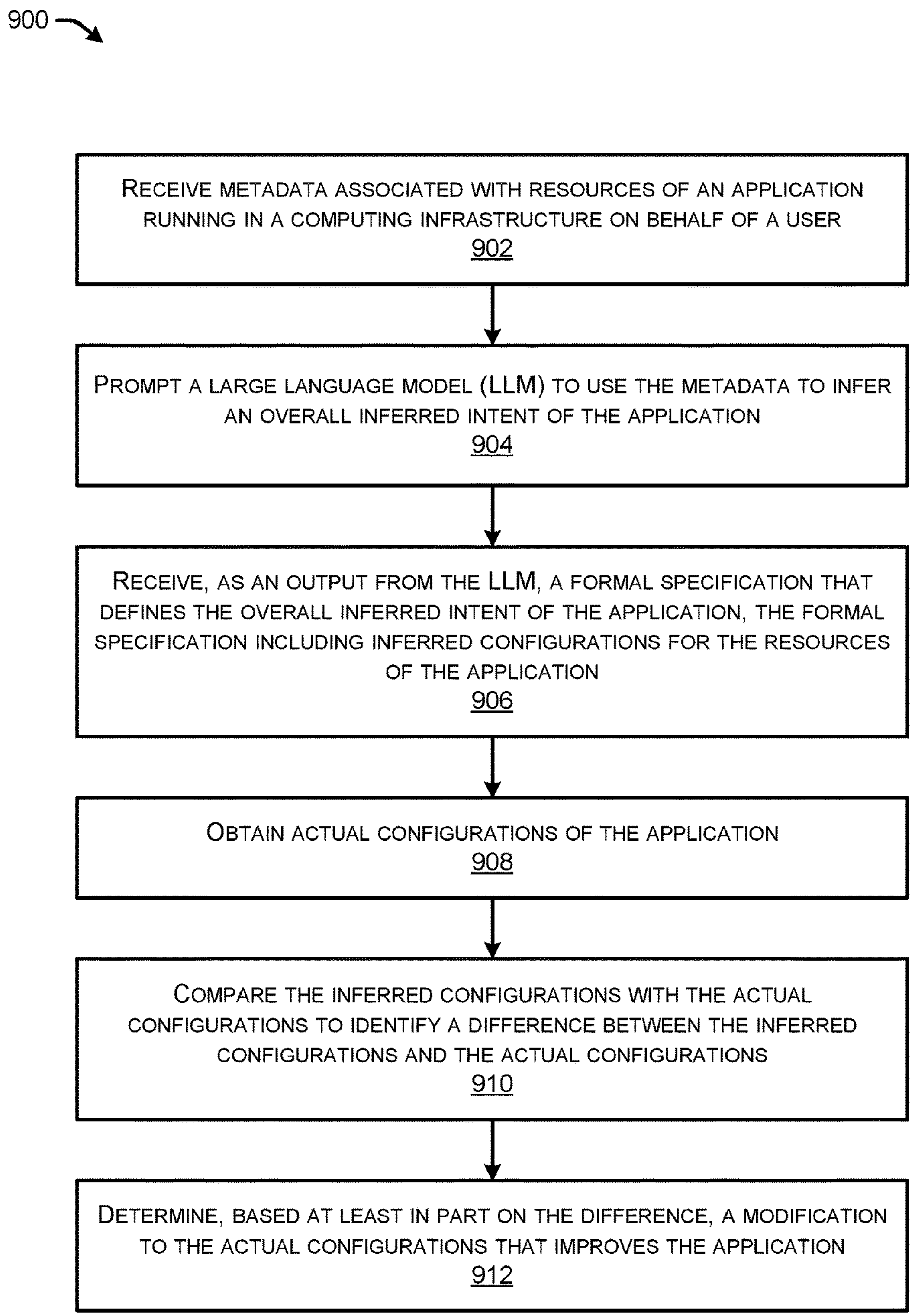
FIG. 9 illustrates a flow diagram of an example process for an intent-inference system to provide metadata of an application to an LLM to infer an overall intent of the application, and use the inferred overall intent to determine a modification that improves the application.

FIGS. 7, 8, and 9 illustrate flow diagrams of example processes 700, 800, and 900, that illustrate aspects of the functions performed at least partly by the cloud system 102 as described in this disclosure. The logical operations described herein with respect to FIGS. 7, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example process 700 for an intent-inference system 104 to determine inferred configurations for a resource of an application 114, identify a difference between the inferred configurations 506 and actual configurations 504, and provide a user account with information around a change for the actual configurations 504.

At 702, a cloud system 102 may run the application in the cloud system 102 on behalf of a user account registered with the cloud system 102. Generally, the application 114 includes a plurality of resources (application resources 116) that run on computing resources 112 in private networks of the user account.

At 704, the intent-inference system 104 may obtain actual configurations 504 for the set of resources. For instance, the intent-inference system 104 may use one or more API calls to obtain application metadata 126, including the actual configurations 504, for a set of application resources 116 that help run an application 114.

At 706, the intent-inference system 104 may provide the LLM 122 with a first portion of the actual configurations 504 for a subset of the resources and refrain from providing the LLM 122 with a second portion of the actual configurations 504 for a particular resource. For example, the prompt-engineering system 118 may submit a prompt 310 that includes the actual configurations 504 for a group of resources that have relationships with the particular resource, but refrain from providing the LLM 122 with a second portion of the actual configurations 504 for the particular resource. The LLM 122 may only be provided with some information around the particular resource, such as a name or tags for the particular resource.

At 708, the intent-inference system 104 may receive, as output from the LLM 122, an indication of inferred configurations 506 for the particular resource. The inferred configurations 506 may include various data such as ports that are open or closed for various types of traffic, security groups or rules (e.g., ACLs, firewall rules, etc.), enabled protocols, and so forth, that are inferred for the application 114 as a best guess for the application configurations.

At 710, the intent-inference system 104 and/or another service may identify a difference between the inferred configurations 506 and the second portion of the actual configurations 504 for the particular resource. For instance, the intent-inference system 104 and/or the other service may identify differences regarding what ports are opened or closed in the inferred configurations 506 versus the actual configurations 504, differences in what resources are being used in the inferred configurations 506 versus the actual configurations 504, differences in the types of virtual resources being used in the inferred configurations 506 versus the actual configurations 504, and so forth.

At 712, the intent-inference system 104 may provide the user account with information indicating a change for the second portion of the actual configurations 504 of the particular resource to remedy the difference from the inferred configurations 506. The information indicating the change may result in the actual configurations 504 being the same, or similar, to the inferred configurations 506 (e.g., opening or closing ports, changing security features, swapping out resources, etc.).

In some instances, the process 700 further includes determining, based at least in part on the difference, a security finding 508 in the application 114, and performing an operation based at least in part on the security finding 508.

FIG. 8 illustrates a flow diagram of an example process 800 for providing application metadata 126 of an application 114 to an LLM 122 to infer an overall intent of the application 114 that is used to identify a security finding 508 for the application 114.

At 802, the intent-inference system 104 may receive metadata associated with resources of an application running in a computing infrastructure for a user account associated with the service provider system. For instance, the intent-inference system 104 may use one or more API calls to obtain application metadata 126 for application resources 116 that help run the application 114.

At 804, the intent-inference system 104 may prompt a large language model (LLM) to use the metadata to infer an overall inferred intent of the application 114. For example, the prompt-engineering system 118 may submit one or more prompts 310 that include application metadata 126 for the application 114 for which the prompt-engineering system 118 would like to have the overall inferred intent determined.

At 806, the intent-inference system 104 may receive, from the LLM 122, a formal specification 130 that represents the overall inferred intent of the application 114 where the formal specification 130 includes inferred configurations of the application 114.

At 808, the intent-inference system 104 may identify a security finding 508 of the application 114 at least partly using the inferred configurations. In some instances, the intent-inference system 104 may receive a listing of security findings 508 from a network-security service 224. The intent-inference system 104 may then analyze the security findings 508 with respect to the inferred configurations of the application 114, determine that the security finding has a violation with a particular inferred configuration of the inferred configurations, and modify the security finding 508 based at least in part on the violation that the security finding 508 has with the particular inferred configuration (e.g., escalate the security finding 508, change a severity ranking, etc.).

At 810, the intent-inference system 104 may perform an operation based at least in part on the security finding 508. For instance, the intent-inference system 104 may provide the security finding 508 to a user 106, may escalate or prioritize the security finding 508 in a listing of security findings 508, may modify the application 114 to remedy the security finding 508, and/or perform other operations.

FIG. 9 illustrates a flow diagram of an example process 900 for an intent-inference system 104 to provide metadata of an application 114 to an LLM 122 to infer an overall intent of the application 114, and use the inferred overall intent to determine a modification that improves the application 114.

At 902, the intent-inference system 104 may prompt a large language model (LLM) to use the metadata to infer an overall inferred intent of the application. For example, the prompt-engineering system 118 may submit one or more prompts 310 that include application metadata 126 for the application 114 for which the prompt-engineering system 118 would like to have the overall inferred intent determined.

At 904, the intent-inference system 104 may receive, as an output from the LLM 122, a formal specification 130 that defines the overall inferred intent of the application 114. In some instances, the formal specification 130 includes inferred configurations for the resources of the application 114 (e.g., inferred port rules, inferred protocol rules, inferred security groups, etc.).

At 906, the intent-inference system 104 may obtain actual configurations of the application. For example, the intent-inference system 104 may receive actual configurations 504 for the application 114 as deployed from one or more computing-resource services 210.

At 908 the intent-inference system 104 may compare the inferred configurations with the actual configurations to identify a difference between the inferred configurations and the actual configurations. For instance, one or more automated-reasoning tools 216 may be utilized to analyze the inferred configurations 506 with respect to the actual configurations 504 to identify differences between the configurations (e.g., differences in port rules, differences in firewall rules, differences in access policies, differences in network topologies, differences in virtual resource types, etc.).

At 910, the intent-inference system 104 may determine, based at least in part on the difference, a modification to the actual configurations 504 that improves the application 114. For instance, the intent-inference system 104 may work in conjunction with other cloud-based services (or non-cloud based services) to identify various optimizations, such as more optimized virtual resources to host the application resources 116, more optimized network topologies, more suitable application resources 116 for the application 114, etc.

In some instances, the process 900 further includes receiving, from the user, a request to troubleshoot an issue with the application, determining that the modification to the actual configurations of the application reconciles the difference and remedies the issue, and providing the user with an indication of the modification for the actual configurations to remedy the issue.

In some examples, comparing the inferred configurations with the actual configurations includes determining, using the actual configurations, that a particular resource is running on a virtual machine (VM) of a first VM type, and determining, using the inferred configurations, that a second VM type is more suitable for running the particular resource than the first VM type. In such examples, the process 900 may further comprise providing the user with an indication that the second VM type is more suitable for running the particular resource than the first VM type.

In some instances, the process 900 may further comprise determining, based at least in part on the difference, a security vulnerability in the actual configurations of the application, wherein the modification remedies the security vulnerability, and providing the user with an indication of the security vulnerability and the modification that remedies the security vulnerability.

Figure 10:
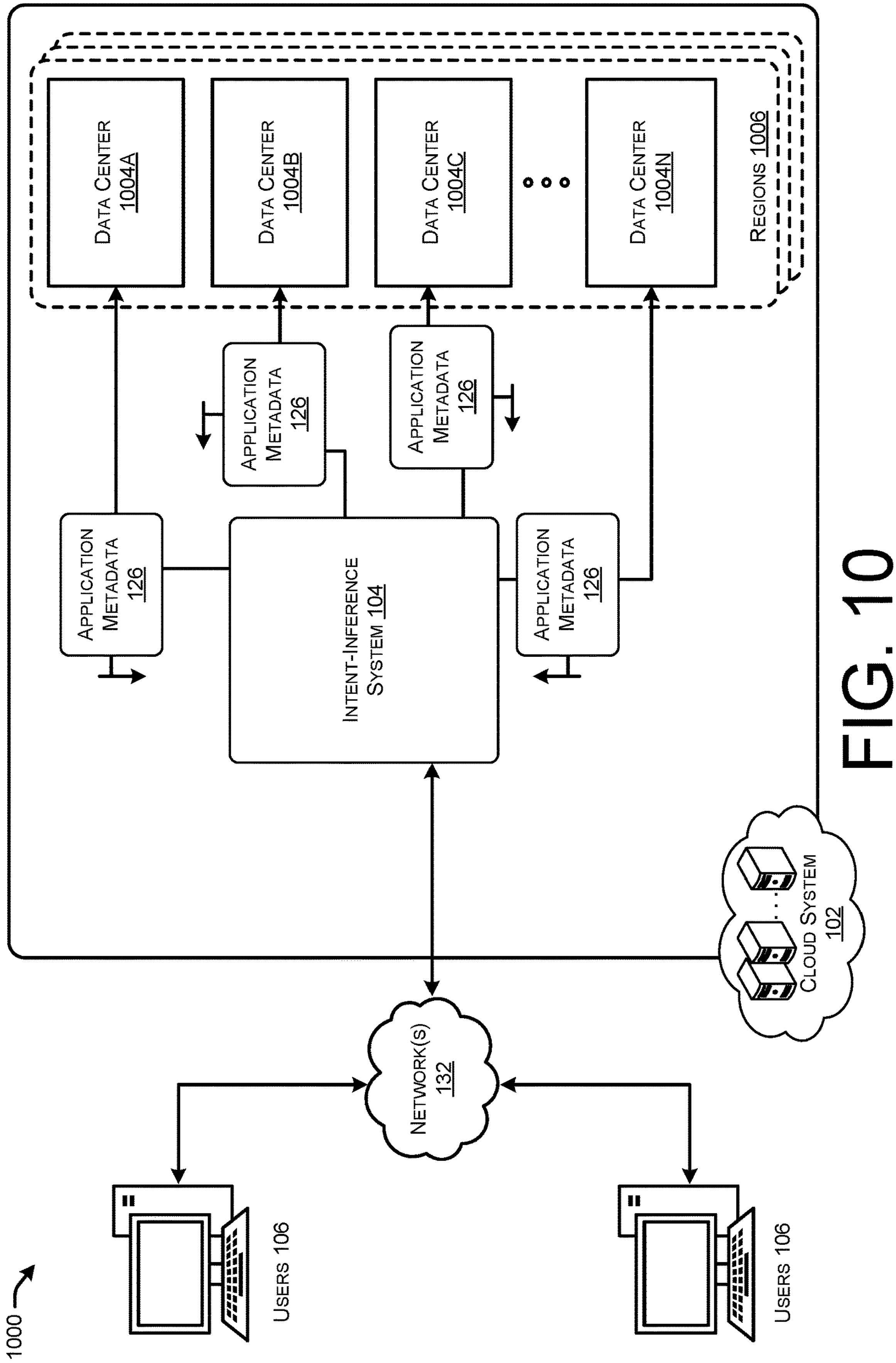
FIG. 10 is a system and network diagram that shows an illustrative operating environment that includes data centers of a cloud system that can be configured to implement aspects of the functionality described herein.

FIG. 10 is a system and network diagram 1000 that shows an illustrative operating environment that includes data centers 1004 in one or more regions 1006 of a cloud system 102 that can be configured to implement aspects of the functionality described herein. The cloud system 102 can provide computing resources, like VM instances and storage, on a permanent or an as-needed basis. Among other types of functionality, the computing resources provided by the cloud system 102 may be utilized to implement the various services described above. As also discussed above, the computing resources provided by the cloud system 102 can include various types of computing resources, such as data processing resources like VM instances, data storage resources, networking resources, data communication resources, network services, and the like.

Each type of computing resource provided by the cloud system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud system 102 can also be configured to provide other types of computing resources not mentioned specifically herein.

The computing resources provided by the cloud system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 106 may utilize user devices 108 to access the cloud system 102 and the computing resources provided by the cloud system 102 over any wired and/or wireless network(s) 132, which can be a wide area communication network ("WAN"), such as the Internet, an intranet or an Internet service provider ("ISP") network or a combination of such networks. For example, and without limitation, a user device 108 operated by a user 106 of the cloud system 102 may be utilized to access the cloud system 102 by way of the network(s) 132. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
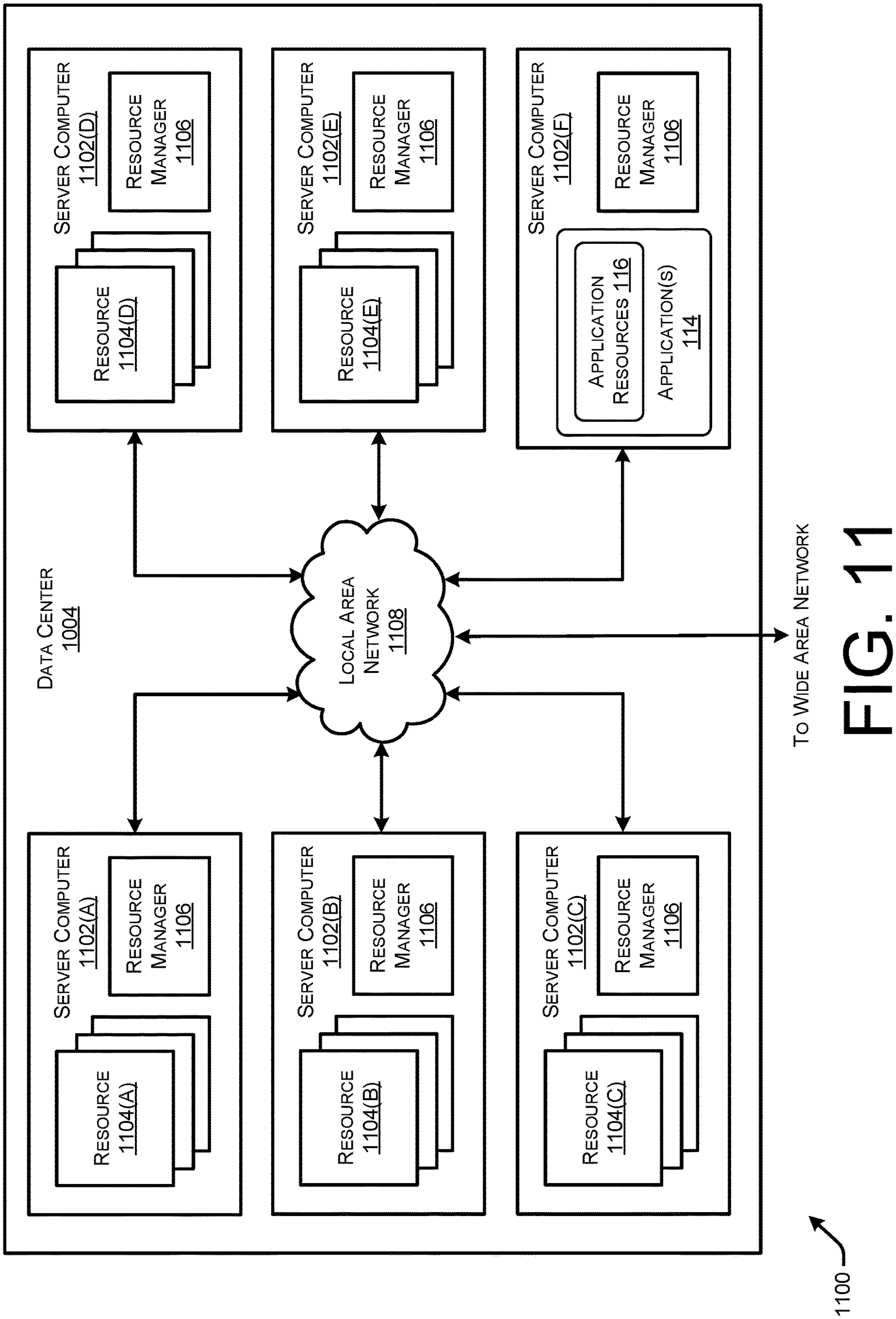
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the cloud system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
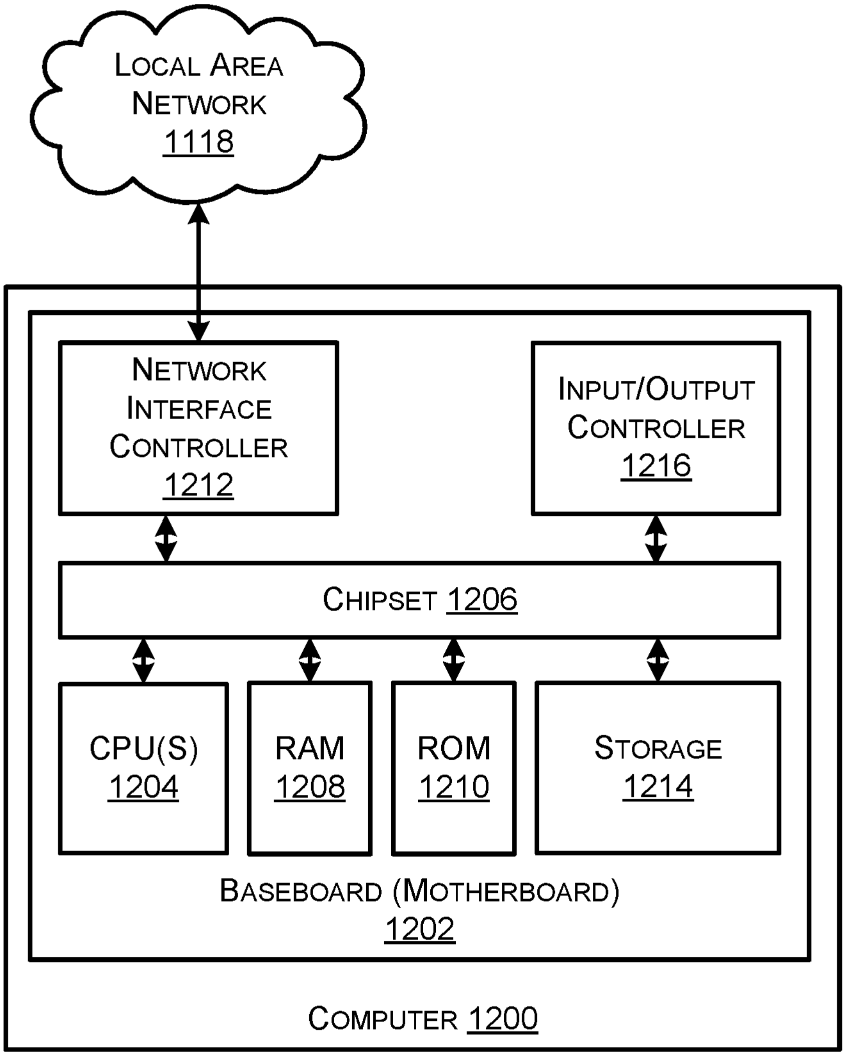
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 132. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 132). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud system 102, and or any components included therein, may be supported by one or more devices similar to computer 1200. Stated otherwise, some or all of the operations performed by the cloud system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A service provider system comprising:
one or more processors; and
one or more computer-readable media storing computer-executable instructions that, when executed by the one or more processors, cause the service provider system to perform operations comprising:
receiving metadata associated with resources of an application running in a computing infrastructure for a user account associated with the service provider system;
prompting a large language model (LLM) to use the metadata to infer an overall inferred intent of the application;
receiving, from the LLM, a formal specification that represents the overall inferred intent of the application, the formal specification including inferred configurations of the application;
receiving, from a security service, security findings that indicate security vulnerabilities for the application;
analyzing the security findings with respect to the inferred configurations of the application;
identifying a security finding of the application at least partly using the inferred configurations;
determining that the security finding has a violation with a particular inferred configuration of the inferred configurations;
modifying the security finding based at least in part on the violation that the security finding has with the particular inferred configuration; and
performing an operation based at least in part on the modified security finding.

2. The service provider system of claim 1, wherein the metadata includes first metadata associated with a first resource and second metadata associated with a second resource, the operations further comprising:
prompting the LLM to use the first metadata to infer a first inferred intent of the first resource;
receiving, from the LLM, a first indication of the first inferred intent of the first resource; prompting the LLM to use the second metadata to infer a second inferred intent of the second resource; and
receiving, from the LLM, a second indication of the second inferred intent of the second resource, wherein prompting the LLM to infer the overall inferred intent of the application includes providing the LLM with the first inferred intent and the second inferred intent.

3. The service provider system of claim 2, the operations further comprising:
identifying, from the resources, a group of resources that have relationships with the first resource; and
obtaining configuration data indicating configurations for the group of resources; wherein prompting the LLM to infer the first inferred intent of the first resource includes:
providing the LLM with the configuration data indicating the configurations for the group of resources that have relationships with the first resource; and
refraining from providing the LLM with additional configuration data that indicates configurations for the first resource such that the LLM infers the additional configuration data for the first resource.

4. The service provider system of claim 2, wherein the first metadata includes:
a name given to the first resource;
a tag assigned to the first resource; and
a portion of configuration data indicating configurations of the first resource, wherein the first metadata includes less than all of the configurations of the first resource.

5. The service provider system of claim 1, the operations further comprising:
obtaining actual configurations for the application of the user account;
identifying a difference between the inferred configurations and the actual configurations; and
determining, based at least in part on the difference, a modification for the actual configurations that improves the application.

6. The service provider system of claim 1, the operations further comprising obtaining actual configurations for the application of the user account, wherein:
identifying the security finding includes identifying a difference between the inferred configurations and the actual configurations; and
performing the operation includes providing the user account with an indication of the security finding.

7. The service provider system of claim 1, the operations further comprising:
receiving, from the user account, a request to troubleshoot an issue with the application;
obtaining actual configurations for the application of the user account;
identifying a difference between the inferred configurations and the actual configurations;
determining a modification for the actual configurations of the application that reconciles the difference with the inferred configurations remedies the issue; and
providing the user account with an indication of the modification for the actual configurations to remedy the issue.

8. The service provider system of claim 1, the operations further comprising:

obtaining actual configurations for the application of the user account;

determining, using the actual configurations, that a particular resource is running on a first virtual resource type;

determining, using the inferred configurations, that a second virtual resource type is more suitable for running the particular resource than the first virtual resource type; and providing the user account with an indication that the second virtual resource type is more suitable for running the particular resource than the first virtual resource type.

9. A method comprising:

receiving metadata associated with resources of an application running in a computing infrastructure for a user account associated with a service provider system;

prompting a large language model (LLM) to use the metadata to infer an overall inferred intent of the application;

receiving, from the LLM, a formal specification that defines the overall inferred intent of the application, the formal specification including inferred configurations of the application;

receiving, from a security service, security findings that indicate security vulnerabilities for the application;

analyzing the security findings with respect to the inferred configurations of the application;

identifying a security finding of the application at least partly using the inferred configurations;

determining that the security finding has a violation with a particular inferred configuration of the inferred configurations;

modifying the security finding based at least in part on the violation that the security finding has with the particular inferred configuration; and performing an operation based at least in part on the modified security finding.

10. The method of claim 9, further comprising:

obtaining actual configurations of the application;

comparing the inferred configurations with the actual configurations to identify a difference between the inferred configurations and the actual configurations;

determining, based at least in part on the difference, a configuration modification to the actual configurations that improves the application;

receiving, from a user associated with the user account, a request to troubleshoot an issue with the application;

determining that the configuration modification to the actual configurations of the application reconciles the difference and remedies the issue; and providing the user with an indication of the configuration modification for the actual configurations to remedy the issue.

11. The method of claim 10, wherein comparing the inferred configurations with the actual configurations includes determining, using the actual configurations, that a particular resource is running on a virtual machine (VM) of a first VM type; and determining, using the inferred configurations, that a second VM type is more suitable for running the particular resource than the first VM type; and further comprising providing the user with an indication that the second VM type is more suitable for running the particular resource than the first VM type.

12. The method of claim 11, further comprising determining, based at least in part on the difference, a security vulnerability in the actual configurations of the application, wherein the configuration modification remedies the security vulnerability; and providing the user with an indication of the security vulnerability and the configuration modification that remedies the security vulnerability.

13. The method of claim 9, wherein the metadata includes first metadata associated with a first resource and second metadata associated with a second resource, further comprising:

prompting the LLM to use the first metadata to infer a first inferred intent of the first resource;

receiving, from the LLM, a first indication of the first inferred intent of the first resource;

prompting the LLM to use the second metadata to infer a second inferred intent of the second resource; and receiving, from the LLM, a second indication of the second inferred intent of the second resource, wherein prompting the LLM to infer the overall inferred intent of the application includes providing the LLM with the first inferred intent and the second inferred intent.

14. The method of claim 13, further comprising:

generating a first human-readable description of the first inferred intent of the first resource;

generating a second human-readable description of the second inferred intent of the second resource;

generating a third human-readable description of the overall inferred intent of the application; and providing a user associated with the user account with access to the first, second, and third human-readable descriptions.

15. The method of claim 13, further comprising:

identifying, from the resources, a group of resources that have relationships with the first resource;

obtaining configuration data indicating configurations for the group of resources;

wherein prompting the LLM to infer the first inferred intent of the first resource includes:

providing the LLM with the configuration data indicating the configurations for the group of resources that have relationships with the first resource; and refraining from providing the LLM with additional configuration data that indicates configurations for the first resource such that the LLM infers the additional configuration data for the first resource.

* * * * *